US012786794B2

(12) United States Patent
Xu

(10) Patent No.: US 12,786,794 B2
(45) Date of Patent: Nov. 3, 2026

(54) METHOD AND APPARATUS FOR SETTING UP SESSION WITH REQUIRED QUALITY OF SERVICE

(71) Applicant: Telefonaktiebolaget LM Ericsson (publ), Stockholm (SE)

(72) Inventor: Wenliang Xu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 368 days.

(21) Appl. No.: 18/570,212

(22) PCT Filed: Jun. 30, 2022

(86) PCT No.: PCT/CN2022/102854

§ 371 (c)(1),
(2) Date: Dec. 14, 2023

(87) PCT Pub. No.: WO2023/274366

PCT Pub. Date: Jan. 5, 2023

(65) Prior Publication Data

US 2024/0276300 A1 Aug. 15, 2024

(30) Foreign Application Priority Data

Jul. 1, 2021 (WO) ................ PCT/CN2021/104039

(51) Int. Cl.
*H04W 28/08* (2023.01)
*H04L 12/14* (2006.01)

(52) U.S. Cl.
CPC ..... *H04W 28/0967* (2020.05); *H04L 12/1407* (2013.01)

(58) Field of Classification Search
CPC ............. H04W 28/0967; H04W 28/02; H04W 4/24; H04L 12/1407; H04L 41/0894;
(Continued)

(56) References Cited

U.S. PATENT DOCUMENTS 8,370,936 B2 * 2/2013 Zuk ..................... H04L 63/0254 713/168
9,893,883 B1 * 2/2018 Chaubey ............... H04L 63/029
(Continued)

FOREIGN PATENT DOCUMENTS

CN 108064032 A * 5/2018 ............. H04W 4/24
CN 111543028 A 8/2020
(Continued)

OTHER PUBLICATIONS

Author Unknown, "Technical Specification Group Services and System Aspects; Functional stage 2 description of Location Services (LCS) (Release 16)," Technical Specification 23.271, Version 16.0.0, Jul. 2020, 3GPP Organizational Partners, 188 pages.
(Continued)

*Primary Examiner* — Michael A Keller
(74) *Attorney, Agent, or Firm* — Withrow & Terranova, PLLC

(57) ABSTRACT

Embodiments of the present disclosure provide method and apparatus for setting up session with required QoS. A method performed by a server comprises sending a packet flow description (PFD) management request to an exposure function entity. The PFD management request comprises at least one PFD comprising information used for traffic detection of a specific application service and an application identifier corresponding to the specific application service. The method further comprises providing specific quality of service (QoS) information and the application identifier corresponding to the specific application service for requesting data session with the specific QoS to a policy function entity.

14 Claims, 10 Drawing Sheets

(58) Field of Classification Search

CPC ............ H04L 47/2483; H04L 47/2425; H04M 15/66; H04M 15/8016

See application file for complete search history.

(56) References Cited

U.S. PATENT DOCUMENTS

| | | | | |
|---|---|---|---|---|
| 9,998,982 | B2 * | 6/2018 | Horn | H04L 67/51 |
| 10,264,411 | B2 * | 4/2019 | Bhalla | H04W 4/08 |
| 11,153,265 | B1 * | 10/2021 | Fayed | H04L 61/5007 |
| 11,444,931 | B1 * | 9/2022 | Quevedo | H04L 63/1458 |
| 11,855,856 | B1 * | 12/2023 | Guduru | H04L 41/14 |
| 11,956,859 | B2 * | 4/2024 | Kim | H04W 76/22 |
| 12,120,625 | B2 * | 10/2024 | Tiwari | H04W 48/18 |
| 12,155,532 | B1 * | 11/2024 | Garcarz | H04L 41/16 |
| 12,212,500 | B2 * | 1/2025 | Abdelmalek | H04L 47/2475 |
| 12,425,818 | B2 * | 9/2025 | Yan | H04M 15/85 |
| 12,483,866 | B2 * | 11/2025 | Muñoz De La Torre Alonso | H04L 12/1403 |
| 2013/0163731 | A1 * | 6/2013 | Yan | H04M 7/006 719/329 |
| 2013/0312054 | A1 * | 11/2013 | Wang | H04L 63/166 726/1 |
| 2016/0183169 | A1 * | 6/2016 | Horn | H04L 67/51 709/225 |
| 2019/0089602 | A1 * | 3/2019 | Bagade | H04L 41/082 |
| 2019/0207866 | A1 * | 7/2019 | Pathak | H04L 41/22 |
| 2019/0222588 | A1 * | 7/2019 | Marzorati | H04L 67/564 |
| 2020/0045753 | A1 * | 2/2020 | Dao | H04W 4/08 |
| 2020/0067954 | A1 * | 2/2020 | Plonka | H04L 61/4511 |
| 2020/0145876 | A1 * | 5/2020 | Dao | H04W 28/0268 |
| 2020/0162239 | A1 * | 5/2020 | Carver | G06F 16/2365 |
| 2020/0167341 | A1 * | 5/2020 | Carver | H04L 9/3073 |
| 2020/0186501 | A1 * | 6/2020 | Neystadt | H04L 63/08 |
| 2020/0186568 | A1 * | 6/2020 | Erb | H04L 9/0841 |
| 2020/0329008 | A1 * | 10/2020 | Dao | H04L 67/63 |
| 2020/0374314 | A1 * | 11/2020 | Kampanakis | H04L 63/101 |
| 2020/0396673 | A1 * | 12/2020 | Tiwari | H04W 12/06 |
| 2020/0396788 | A1 * | 12/2020 | Tiwari | H04W 76/11 |
| 2021/0099367 | A1 * | 4/2021 | Han | H04L 43/026 |
| 2021/0112010 | A1 * | 4/2021 | May | H04L 63/1425 |
| 2021/0120473 | A1 | 4/2021 | Yao et al. | |
| 2021/0250192 | A1 * | 8/2021 | Alonso Franco | H04L 12/14 |
| 2021/0258350 | A1 * | 8/2021 | Buck | H04L 63/0272 |
| 2021/0288904 | A1 * | 9/2021 | Cañete Martinez | H04L 45/3065 |
| 2021/0345162 | A1 * | 11/2021 | Sarker | H04L 69/164 |
| 2022/0086691 | A1 * | 3/2022 | Ihlar | H04W 28/10 |
| 2022/0132623 | A1 * | 4/2022 | Xu | H04W 76/10 |
| 2022/0174483 | A1 * | 6/2022 | Tiwari | H04W 12/06 |
| 2022/0200891 | A1 * | 6/2022 | Keeler | H04L 45/122 |
| 2022/0201040 | A1 * | 6/2022 | Eriksson | H04L 63/0263 |
| 2022/0201090 | A1 * | 6/2022 | Håkansson | H04W 4/50 |
| 2022/0224650 | A1 * | 7/2022 | Xu | H04L 47/2483 |
| 2023/0141233 | A1 * | 5/2023 | Pulipati | H04W 48/16 726/4 |
| 2023/0147622 | A1 * | 5/2023 | Kim | H04W 80/10 455/414.1 |
| 2023/0254254 | A1 * | 8/2023 | Augé | H04L 47/24 370/235 |
| 2023/0269300 | A1 * | 8/2023 | Roy | H04L 67/148 |
| 2023/0328514 | A1 * | 10/2023 | Muñoz De La Torre Alonso | H04W 12/033 380/27 |
| 2023/0336369 | A1 * | 10/2023 | Muñoz De La Torre Alonso | H04M 15/775 |
| 2023/0336793 | A1 * | 10/2023 | Stalioraitis | H04L 69/22 |
| 2023/0370423 | A1 * | 11/2023 | Muñoz De La Torre Alonso | H04L 63/0236 |
| 2023/0379707 | A1 * | 11/2023 | Tiwari | H04L 9/3242 |
| 2024/0022484 | A1 * | 1/2024 | Guduru | H04L 41/5009 |
| 2024/0031925 | A1 * | 1/2024 | Tiwari | H04W 48/18 |
| 2024/0064847 | A1 * | 2/2024 | Tiwari | H04W 76/20 |
| 2024/0107481 | A1 * | 3/2024 | Tiwari | H04W 76/15 |
| 2024/0146702 | A1 * | 5/2024 | Puente Pestaña | H04L 63/0442 |
| 2024/0187968 | A1 * | 6/2024 | Tiwari | H04W 8/04 |
| 2024/0236910 | A1 * | 7/2024 | Tiwari | H04W 48/14 |
| 2024/0259932 | A1 * | 8/2024 | Ianev | H04W 48/16 |
| 2024/0259982 | A1 * | 8/2024 | Tiwari | H04W 28/02 |
| 2024/0260112 | A1 * | 8/2024 | Tiwari | H04W 48/18 |
| 2024/0276300 | A1 * | 8/2024 | Xu | H04M 15/66 |
| 2024/0284377 | A1 * | 8/2024 | Tiwari | H04W 60/04 |
| 2024/0292281 | A1 * | 8/2024 | Ianev | H04W 36/00222 |
| 2024/0298248 | A1 * | 9/2024 | Tiwari | H04W 48/06 |
| 2024/0323828 | A1 * | 9/2024 | Ianev | H04W 48/18 |
| 2024/0364679 | A1 * | 10/2024 | Steben | H04L 61/5046 |
| 2024/0365409 | A1 * | 10/2024 | Tamura | H04W 72/1268 |
| 2024/0365432 | A1 * | 10/2024 | Tamura | H04W 76/30 |
| 2024/0373481 | A1 * | 11/2024 | Ianev | H04W 48/06 |
| 2024/0388595 | A1 * | 11/2024 | Cam-Winget | H04L 63/1433 |
| 2024/0406188 | A1 * | 12/2024 | Tiwari | H04W 12/06 |
| 2024/0414611 | A1 * | 12/2024 | Tiwari | H04W 36/08 |
| 2025/0007934 | A1 * | 1/2025 | Elhelo | H04L 63/20 |
| 2025/0016711 | A1 * | 1/2025 | Tiwari | H04W 12/106 |
| 2025/0039820 | A1 * | 1/2025 | Tiwari | H04W 60/04 |
| 2025/0056665 | A1 * | 2/2025 | Ianev | H04W 76/18 |
| 2025/0063336 | A1 * | 2/2025 | Tiwari | H04W 8/18 |
| 2025/0071653 | A1 * | 2/2025 | Ianev | H04W 76/12 |
| 2025/0071668 | A1 * | 2/2025 | Tiwari | H04W 64/00 |
| 2025/0133424 | A1 * | 4/2025 | Tamura | H04W 24/04 |
| 2025/0142507 | A1 * | 5/2025 | Balmakhtar | H04W 48/16 |
| 2025/0184707 | A1 * | 6/2025 | Tamura | H04L 65/1104 |
| 2025/0193824 | A1 * | 6/2025 | Tiwari | H04W 60/00 |
| 2025/0193825 | A1 * | 6/2025 | Tiwari | H04L 45/80 |
| 2025/0202912 | A1 * | 6/2025 | Savin | H04L 63/1416 |
| 2025/0211537 | A1 * | 6/2025 | Rommer | H04L 45/308 |
| 2025/0238520 | A1 * | 7/2025 | Ramiah | G06Q 10/0875 |
| 2025/0310362 | A1 * | 10/2025 | Duan | H04L 63/0236 |
| 2025/0344142 | A1 * | 11/2025 | Tiwari | H04W 48/18 |
| 2025/0374174 | A1 * | 12/2025 | Tiwari | H04L 45/851 |
| 2025/0386264 | A1 * | 12/2025 | Tiwari | H04W 36/08 |
| 2025/0386265 | A1 * | 12/2025 | Tiwari | H04W 12/06 |
| 2025/0386282 | A1 * | 12/2025 | Tiwari | H04W 48/12 |
| 2025/0393010 | A1 * | 12/2025 | Thiruvasagam | H04W 60/06 |
| 2026/0019303 | A1 * | 1/2026 | Schmitt | H04L 12/4641 |
| 2026/0019933 | A1 * | 1/2026 | Tiwari | H04W 48/18 |
| 2026/0025643 | A1 * | 1/2026 | Muñoz De La Torre Alonso | H04W 4/24 |

FOREIGN PATENT DOCUMENTS

| | | | | | |
|---|---|---|---|---|---|
| CN | 112804717 | A | | 5/2021 | |
| CN | 113795014 | A | * | 12/2021 | H04L 61/4511 |
| CN | 114451013 | A | * | 5/2022 | H04W 24/10 |
| CN | 114930913 | A | * | 8/2022 | H04W 76/11 |
| CN | 113795014 | B | * | 11/2022 | H04W 8/14 |
| EP | 3697171 | A1 | * | 8/2020 | H04W 63/1408 |
| ID | P202302693 | A | * | 3/2023 | |
| JP | 2023529714 | A | * | 7/2023 | H04L 12/1403 |
| TR | 201808439 | T4 | * | 7/2018 | H04W 28/02 |
| WO | WO-03067810 | A1 | * | 8/2003 | H04L 63/0254 |
| WO | WO-2012044228 | A1 | * | 4/2012 | H04W 72/51 |
| WO | WO-2014051618 | A1 | * | 4/2014 | H04W 76/11 |
| WO | WO-2016073533 | A1 | * | 6/2016 | H04W 8/26 |
| WO | WO-2017025152 | A1 | * | 2/2017 | H04W 16/14 |
| WO | WO-2017124820 | A1 | * | 7/2017 | H04L 12/141 |
| WO | WO-2017125698 | A1 | * | 7/2017 | H04M 15/66 |
| WO | WO-2019120628 | A1 | * | 6/2019 | H04L 47/2441 |
| WO | WO-2020036928 | A1 | * | 2/2020 | H04W 28/0268 |
| WO | WO-2020127148 | A1 | * | 6/2020 | H04L 45/38 |
| WO | WO-2021028435 | A1 | * | 2/2021 | H04L 41/0894 |
| WO | WO-2021060840 | A1 | * | 4/2021 | H04W 76/30 |
| WO | WO-2021066498 | A1 | * | 4/2021 | H04L 67/51 |
| WO | WO-2021091232 | A1 | * | 5/2021 | H04L 61/2517 |
| WO | WO-2021138812 | A1 | * | 7/2021 | H04L 45/306 |
| WO | WO-2021158001 | A1 | * | 8/2021 | H04L 65/40 |
| WO | WO-2021176415 | A1 | * | 9/2021 | H04L 41/12 |
| WO | WO-2022008104 | A1 | * | 1/2022 | H04L 43/08 |
| WO | WO-2022012764 | A1 | * | 1/2022 | H04L 65/1069 |
| WO | WO-2022019044 | A1 | * | 1/2022 | H04L 41/40 |
| WO | WO-2022036102 | A1 | * | 2/2022 | H04W 36/125 |
| WO | WO-2022156918 | A1 | * | 7/2022 | H04L 63/1408 |

(56) References Cited

FOREIGN PATENT DOCUMENTS

| | | | | |
|---|---|---|---|---|
| WO | WO-2023002991 A1 * | 1/2023 | ............ | H04W 60/06 |
| WO | WO-2023065088 A1 * | 4/2023 | ............ | H04L 65/40 |
| WO | WO-2025018245 A1 * | 1/2025 | ............ | H04W 76/15 |

OTHER PUBLICATIONS

Author Unknown, "Technical Specification Group Services and System Aspects; 5G System (5GS) Location Services (LCS); Stage 2 (Release 17)," Technical Specification 23.273, Version 17.1.0, Jun. 2021, 3GPP Organizational Partners, 99 pages.

Author Unknown, "Technical Specification Group Services and System Aspects; Architecture enhancements for 5G System (5GS) to support network data analytics services (Release 17)," Technical Specification 23.288, Version 17.1.0, Jun. 2021, 3GPP Organizational Partners, 192 pages.

Author Unknown, "Technical Specification Group Services and System Aspects; System architecture for the 5G System (5GS); Stage 2 (Release 17)," Technical Specification 23.501, Version 17.0.0, Mar. 2021, 3GPP Organizational Partners, 489 pages.

Author Unknown, "Technical Specification Group Services and System Aspects; Procedures for the 5G System (5GS); Stage 2 (Release 17)," Technical Specification 23.502, Version 17.0.0, Mar. 2021, 3GPP Organizational Partners, 646 pages.

Author Unknown, "Technical Specification Group Services and System Aspects; Policy and charging control framework for the 5G System (5GS); Stage 2 (Release 17)," Technical Specification 23.503, Version 17.0.0, Mar. 2021, 3GPP Organizational Partners, 128 pages.

Author Unknown, "Technical Specification Group Services and System Aspects; Architecture for enabling Edge Applications; (Release 17)," Technical Specification 23.558, Version 2.1.0, Apr. 2021, 3GPP Organizational Partners, 152 pages.

Author Unknown, "Technical Specification Group Services and System Aspects; Architecture for enabling Edge Applications; (Release 17)," Technical Specification 23.558, Version 17.0.0, Jun. 2021, 3GPP Organizational Partners, 157 pages.

Author Unknown, "Technical Specification Group Services and System Aspects; Architecture enhancements to facilitate communications with packet data networks and applications (Release 16)," Technical Specification 23.682, Version 16.9.0, Mar. 2021, 3GPP Organizational Partners, 135 pages.

Author Unknown, "Technical Specification Group Core Network and Terminals; T8 reference point for Northbound APIs; (Release 17)," Technical Specification 29.122, Version 17.1.0, Mar. 2021, 3GPP Organizational Partners, 408 pages.

Author Unknown, "Technical Specification Group Radio Access Network; Evolved Universal Terrestrial Radio Access Network (E-UTRAN); Stage 2 functional specification of User Equipment (UE) positioning in E-UTRAN (Release 16)," Technical Specification 36.305, Version 16.2.0, Sep. 2020, 3GPP Organizational Partners, 92 pages.

Author Unknown, "Technical Specification Group Radio Access Network; NG Radio Access Network (NG-RAN); Stage 2 functional specification of User Equipment (UE) positioning in NG-RAN (Release 16)," Technical Specification 38.305, Version 16.4.0, Mar. 2021, 3GPP Organizational Partners, 119 pages.

Ericsson, "S2-2100293: Application Identifier for SCEF API Chargeable Party and AS Session with Qos," 3GPP TSG-SA2 Meeting #143E, Feb. 24-Mar. 9, 2021, Electronic Meeting, 5 pages.

Qualcomm Incorporated, et al., "S4-210537: Key Topic Traffic Identification," 3GPP TSG-SA4 Meeting 113-e, Apr. 6-14, 2021, Electronic Meeting, 7 pages.

Samsung, "S6-210633: Terms and abbreviations for service continuity," 3GPP TSG-SA WG6 Meeting #42-e, Mar. 1-9, 2021, Electronic Meeting, 30 pages.

International Search Report and Written Opinion for International Patent Application No. PCT/CN2022/102854, mailed Sep. 26, 2022, 9 pages.

Author Unknown, "Technical Specification Group Core Network and Terminals; T8 reference point for Northbound APIs; (Release 17)," Technical Specification 29.122, Version 17.2.0, Jun. 2021, 3GPP Organizational Partners, 429 pages.

Chitturi, Suresh, "Enabling Edge Computing Applications in 3GPP," blog post, www.3gpp.org/news-events/3gpp-news/edge-sa6, Feb. 2, 2021, 3GPP Organizational Partners, 4 pages.

Extended European Search Report for European Patent Application No. 22832178.2, mailed Apr. 14, 2025, 14 pages.

* cited by examiner

METHOD AND APPARATUS FOR SETTING UP SESSION WITH REQUIRED QUALITY OF SERVICE

This application is a 35 U.S.C. § 371 national phase filing of International Application No. PCT/CN2022/102854, filed Jun. 30, 2022, which claims the benefit of International Application No. PCT/CN2021/104039, filed Jul. 1, 2021, the disclosures of which are incorporated herein by reference in their entireties.

TECHNICAL FIELD

The non-limiting and exemplary embodiments of the present disclosure generally relate to the technical field of communications, and specifically to methods and apparatuses for setting up session with required QoS (quality of service).

BACKGROUND

This section introduces aspects that may facilitate a better understanding of the disclosure. Accordingly, the statements of this section are to be read in this light and are not to be understood as admissions about what is in the prior art or what is not in the prior art.

A server (such as Application Function (AF), application server (AS), Edge Application Server (EAS), or Edge Enabler Server (EES), etc.) may interact with a core network (such as 3rd Generation Partnership Project (3GPP) core network) in order to set up session with required QoS. For example, the server may invoke 3GPP core network function application programming interfaces (API) directly, if it is an entity trusted by the 3GPP core network. The server may invoke 3GPP core network capabilities through the EES. The server may invoke the 3GPP core network capability through the capability exposure functions, such as network exposure function (NEF) or service capability exposure function (SCEF).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Table 5.14.2.1.2-1 of 3GPP TS 29.122 V17.1.0, the disclosure of which is incorporated by reference herein in its entirety, describes definition of type AsSessionWithQoS-Subscription.

TABLE 5.14.2.1.2-1

Definition of type AsSessionWithQoSSubscription

| Attribute name | Data type | Cardinality | Description | Applicability (NOTE 1) |
|---|---|---|---|---|
| self | Link | 0 . . . 1 | Link to the resource "Individual AS Session with Required QoS Subscription". This parameter shall be supplied by the SCEF in HTTP responses. | |
| supportedFeatures | SupportedFeatures | 0 . . . 1 | Used to negotiate the supported optional features of the API as described in subclause 5.2.7. This attribute shall be provided in the POST request and in the response of successful resource creation. | |
| notificationDestination | Link | 1 | Contains the URL to receive the notification bearer level event(s) from the SCEF. | |
| flowInfo | array(FlowInfo) | 0 . . . N | Describe the IP data flow which requires QoS. (NOTE 2) | |
| ethFlowInfo | array(EthFlowDescription) | 0 . . . N | Identifies Ethernet packet flows. (NOTE 2) | EthAsSessionQoS_5G |
| qosReference | string | 0 . . . 1 | Identifies a pre-defined QoS information | |
| altQoSReferences | array(string) | 0 . . . N | Identifies an ordered list of pre-defined QoS information. The lower the index of the array for a given entry, the higher the priority. | AlternativeQoS_5G |
| disUeNotif | boolean | 0 . . . 1 | Indicates to disable QoS flow parameters signalling to the UE when the SMF is notified by the NG-RAN of changes in the fulfilled QoS situation when it is included and set to "true". The fulfilled situation is either the QoS profile or an Alternative QoS Profile. The default value "false" shall apply, if the attribute is not present and has not been supplied previously. | DisableUENotification_5G |
| ueIpv4Addr | Ipv4Addr | 0 . . . 1 | The Ipv4 address of the UE. (NOTE 2) | |
| ipDomain | string | 0 . . . 1 | The IPv4 address domain identifier. The attribute may only be provided if the uelpv4Addr attribute is present. | |
| ueIpv6Addr | Ipv6Addr | 0 . . . 1 | The Ipv6 address of the UE. (NOTE 2) | |
| macAddr | MacAddr48 | 0 . . . 1 | Identifies the MAC address. (NOTE 2) | EthAsSessionQoS_5G |
| usageThreshold | UsageThreshold | 0 . . . 1 | Time period and/or traffic volume in which the QoS is to be applied. | |
| sponsorInfo | SponsorInformation | 0 . . . 1 | Indicates a sponsor information | |

TABLE 5.14.2.1.2-1-continued

Definition of type AsSessionWithQoSSubscription

| Attribute name | Data type | Cardinality | Description | Applicability (NOTE 1) |
| --- | --- | --- | --- | --- |
| qosMonInfo | QosMonitoringInformation | 0 . . . 1 | Qos Monitoring information. It can be present when the event "QOS_MONITORING" is subscribed. | QoSMonitoring_5G |
| requestTestNotification | boolean | 0 . . . 1 | Set to true by the SCS/AS to request the SCEF to send a test notification as defined in subclause 5.2.5.3. Set to false or omitted otherwise. | Notification_test_event |
| websockNotifConfig | WebsockNotifConfig | 0 . . . 1 | Configuration parameters to set up notification delivery over Websocket protocol as defined in subclause 5.2.5.4. | Notification_websocket |

NOTE 1:
Properties marked with a feature as defined in subclause 5.14.4 are applicable as described in subclause 5.2.7. If no features are indicated, the related property applies for all the features.
NOTE 2:
One of "ueIpv4Addr", "ueIpv6Addr" or "macAddr" shall be included. If ipv4 or ipv6 address is provided, IP flow information shall be provided. If MAC address is provided, Ethernet flow information shall be provided.

According to Table 5.14.2.1.2-1, Flow description(s) comprised in Nnef_AFsessionWithQoS_Create request message describes the IP data flow which requires QoS. IP flow description can not support traffic filter for encrypted traffic (such as HTTPS traffic). In addition, several application services may be deployed on the same AF, which means the AF exposes the same IP address and port (e.g. port number 443 for HTTPS), which makes the IP flow description impossible to distinguish different application services on the same AF.

To overcome or mitigate at least one above mentioned problems or other problems, an improved solution for setting up session with required QoS may be desirable.

In a first aspect of the disclosure, there is provided a method performed by a server. The method comprises sending a packet flow description (PFD) management request to an exposure function entity. The PFD management request comprises at least one PFD comprising information used for traffic detection of a specific application service and an application identifier corresponding to the specific application service. The method further comprises providing specific quality of service (QoS) information and the application identifier corresponding to the specific application service for requesting data session with the specific QoS to a policy function entity.

In an embodiment, the information used for traffic detection of the specific application service comprises at least one of a domain name or a uniform resource locator.

In an embodiment, the domain name comprises Transport Layer Security Server Name Indication (TLS SNI).

In an embodiment, the traffic detection of the specific application service comprises encrypted traffic detection of the specific application service.

In an embodiment, providing the specific QoS information and the application identifier corresponding to the specific application service for requesting data session with the specific QoS to the policy function entity comprises directly sending a message comprising the specific QoS information and the application identifier corresponding to the specific application service for requesting data session with the specific QoS to the policy function entity or providing the specific QoS information and the application identifier corresponding to the specific application service for requesting data session with the specific QoS to the policy function entity via the exposure function entity.

In an embodiment, the policy function entity comprises at least one of policy control function (PCF), or policy and charging rules function (PCRF).

In an embodiment, the exposure function entity comprises at least one of network exposure function (NEF), or service capability exposure function (SCEF).

In an embodiment, the server comprises at least one of an edge enabler server or an application server.

In an embodiment, when the server is an edge enabler server, the method further comprises receiving a request for establishing a data session with the specific QoS from an edge application server, wherein the request comprises the information used for traffic detection of the specific application service.

In an embodiment, the request further comprises the application identifier corresponding to the specific application service.

In an embodiment, when the application identifier corresponding to the specific application service is absent in the request, the method further comprises deriving the application identifier corresponding to the specific application service.

In an embodiment, the method further comprises checking whether the edge application server is authorized.

In an embodiment, when the request is for a group of use equipments (UEs) identified by a UE group identifier (ID) or for a single UE identified by a UE ID, the method further comprises sending an event monitoring request for session status of the data session to the exposure function entity. The method further comprises receiving a notification for session status of the data session from the exposure function entity.

In an embodiment, the method further comprises sending a response for the request to the edge application server.

In an embodiment, the data session comprises a protocol data unit (PDU) data session between an application client and the edge application server.

In a second aspect of the disclosure, there is provided a method performed by an edge application server. The method comprises sending a request for establishing a data session with specific quality of service (QoS) to an edge enabler server. The request comprises information used for traffic detection of a specific application service.

In an embodiment, the request is for a group of use equipments (UEs) identified by a UE group identifier (ID) or for a single UE identified by a UE ID.

In an embodiment, the method further comprises receiving a response for the request from the edge enabler server.

In a third aspect of the disclosure, there is provided a method performed by an exposure function entity. The method comprises receiving a packet flow description (PFD) management request from a server. The PFD management request comprises at least one PFD comprising information used for traffic detection of a specific application service and an application identifier corresponding to the specific application service. The method further comprises processing the PFD management request.

In an embodiment, the method further comprises receiving an event monitoring request for session status of a data session from the server. The method further comprises sending a notification for session status of the data session to the server.

In an embodiment, the method further comprises receiving a message comprising specific QoS information and the application identifier corresponding to the specific application service for requesting data session with the specific QoS from the server. In an embodiment, the method further comprises sending a message comprising the specific QoS information and the application identifier corresponding to the specific application service for requesting data session with the specific QoS to a policy function entity.

In a fourth aspect of the disclosure, there is provided a server. The server comprises a processor and a memory coupled to the processor. Said memory contains instructions executable by said processor. Said server is operative to send a packet flow description (PFD) management request to an exposure function entity. The PFD management request comprises at least one PFD comprising information used for traffic detection of a specific application service and an application identifier corresponding to the specific application service. Said server is further operative to provide specific quality of service (QoS) information and the application identifier corresponding to the specific application service for requesting data session with the specific QoS to a policy function entity.

In a fifth aspect of the disclosure, there is provided an edge application server. The edge application server comprises a processor and a memory coupled to the processor. Said memory contains instructions executable by said processor. Said edge application server is operative to send a request for establishing a data session with specific quality of service (QoS) to an edge enabler server. The request comprises information used for traffic detection of a specific application service.

In a sixth aspect of the disclosure, there is provided an exposure function entity. The exposure function entity comprises a processor and a memory coupled to the processor. Said memory contains instructions executable by said processor. Said exposure function entity is operative to receive a packet flow description (PFD) management request from a server. The PFD management request comprises at least one PFD comprising information used for traffic detection of a specific application service and an application identifier corresponding to the specific application service. Said exposure function entity is further operative to process the PFD management request.

In a seventh aspect of the disclosure, there is provided a server. The server comprises a first sending module and a providing module. The first sending module may be configured to send a packet flow description (PFD) management request to an exposure function entity. The PFD management request comprises at least one PFD comprising information used for traffic detection of a specific application service and an application identifier corresponding to the specific application service. The providing module may be configured to provide specific quality of service (QoS) information and the application identifier corresponding to the specific application service for requesting data session with the specific QoS to a policy function entity.

In an embodiment, the server further comprises a first receiving module configured to receive a request for establishing a data session with the specific QoS from an edge application server. The request comprises the information used for traffic detection of the specific application service.

In an embodiment, the server further comprises a deriving module configured to derive the application identifier corresponding to the specific application service when the application identifier corresponding to the specific application service is absent in the request.

In an embodiment, the server further comprises a checking module configured to checking whether the edge application server is authorized.

In an embodiment, the server further comprises a second sending module configured to send an event monitoring request for session status of the data session to the exposure function entity In an embodiment, the server further comprises a second receiving module configured to receive a notification for session status of the data session from the exposure function entity.

In an embodiment, the server further comprises a third sending module configured to sending a response for the request to the edge application server.

In an eighth aspect of the disclosure, there is provided an edge enabler server. The edge enabler server comprises a sending module. The sending module may be configured to send a request for establishing a data session with specific quality of service (QoS) to an edge enabler server. The request comprises information used for traffic detection of a specific application service.

In an embodiment, the edge enabler server further comprises a receiving module configured to receive a response for the request from the edge enabler server.

In a ninth aspect of the disclosure, there is provided an exposure function entity. The exposure function entity comprises a first receiving module and a processing module. The first receiving module may be configured to receive a packet flow description (PFD) management request from a server. The PFD management request comprises at least one PFD comprising information used for traffic detection of a specific application service and an application identifier corresponding to the specific application service. The processing module may be configured to process the PFD management request.

In an embodiment, the exposure function entity further comprises a second receiving module configured to receive an event monitoring request for session status of a data session from the server.

In an embodiment, the exposure function entity further comprises a first sending module configured to send a notification for session status of the data session to the server.

In an embodiment, the exposure function entity further comprises a third receiving module configured to receive a message comprising specific QoS information and the application identifier corresponding to the specific application service for requesting data session with the specific QoS from the server In an embodiment, the exposure function entity further comprises a second sending module configured to sending a message comprising the specific QoS information and the application identifier corresponding to the specific application service for requesting data session with the specific QoS to a policy function entity.

In a tenth aspect of the disclosure, there is provided a computer program product comprising instructions which, when executed on at least one processor, cause the at least one processor to carry out any of the methods according to the first, second and third aspects of the disclosure.

In an eleventh aspect of the disclosure, there is provided a computer-readable storage medium storing instructions which, when executed on at least one processor, cause the at least one processor to carry out any of the methods according to the first, second and third aspects of the disclosure.

Embodiments herein afford many advantages, of which a non-exhaustive list of examples follows. Some embodiments herein may support traffic filter for encrypted traffic (such as HTTPS traffic). Some embodiments herein may enable (encrypted) traffic detection of a specific application service. Some embodiments herein may provide domain name for encrypted traffic detection in QoS API. Some embodiments herein provide domain name to distinguish different application services. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
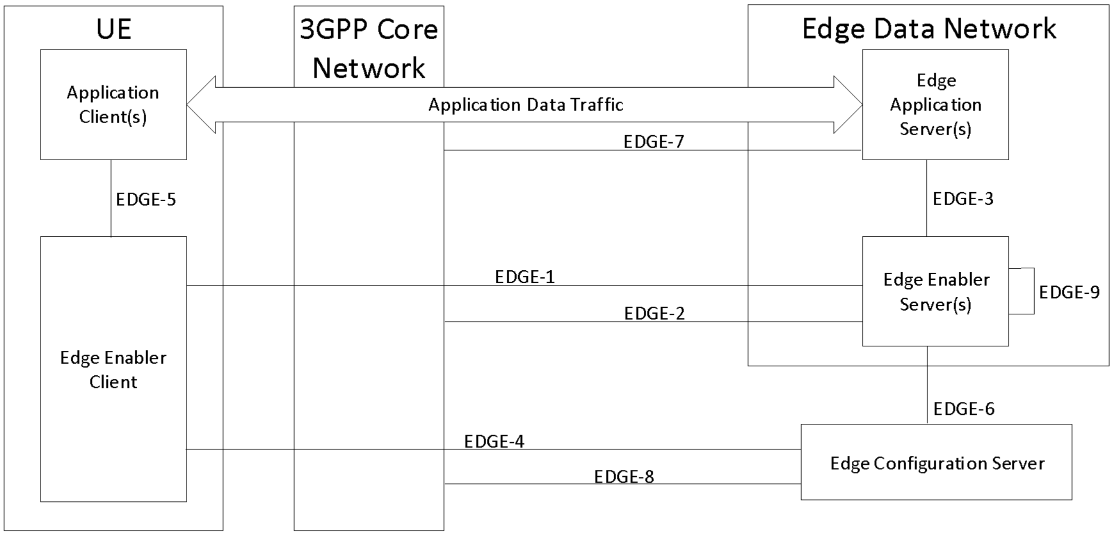
FIG. 1 shows an example architecture for enabling edge applications.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" or "network node" or "network function" refers to any suitable network function (NF) which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. For example, the 4G system (such as LTE) may include MME (Mobile Management Entity), HSS (home subscriber server), Policy and Charging Rules Function (PCRF), Packet Data Network Gateway (PGW), PGW control plane (PGW-C), Serving gateway (SGW), SGW control plane (SGW-C), E-UTRAN Node B (eNB), etc. In other embodiments, the network function may comprise different types of NFs for example depending on a specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Edge Computing Application Enabler Introduction

3GPP TS 23.558 V17.0.0, the disclosure of which is incorporated by reference herein in its entirety, specifies application layer architecture, procedures and information flows necessary for enabling edge applications over 3GPP networks. It includes architectural requirements for enabling edge applications, application layer architecture fulfilling the architecture requirements and procedures to enable the deployment of edge applications.

One of the main areas focused on is to minimize the impact to Edge based applications. So they do not need major Application redevelopment for UE use at the Edge.

FIG. 1 shows an example architecture for enabling edge applications. FIG. 1 is same as FIG. 6.2-4 of 3GPP TS 23.558 V17.0.0. The Edge Data Network (EDN) is a local Data Network. Edge Application Server(s) and the Edge Enabler Server are contained within the EDN. The Edge Configuration Server provides configurations related to the EES, including details of the Edge Data Network hosting the (edge enabler server). The UE contains Application Client(s) (ACs) and the Edge Enabler Client (EEC). The Edge Application Server(s), the Edge Enabler Server and the Edge Configuration Server may interact with the 3GPP core network.

EDGE-3 reference point enables interactions between the Edge Enabler Server and the Edge Application Servers (EAS). It supports:

a) registration of Edge Application Servers with availability information (e.g. time constraints, location constraints);
b) de-registration of Edge Application Servers from the Edge Enabler Server; and
c) providing access to network capability information (e.g. location information).
d) requesting the setup of a data session between Application Client and Edge Application Server with a specific QoS (quality of service).

The other reference points are described in clause 6.5 of 3GPP TS 23.558 V17.0.0.

EES Capability Exposure to EAS

One important functionality in the edge enabling layer is the EES exposed capabilities which include EES capabilities and exposed 3GPP core network capabilities. The 3GPP core network capabilities may be exposed from EES to the Edge Application Server(s) with enhancement, e.g.:

UE location application programming interface (API)
User Plane Path management API
Session with QoS API Session with QoS API (see Details in 3GPP TS 23.558 V17.0.0, Clause 8.6.6)

The Edge Enabler Server exposes the Session with QoS API to the Edge Application Server in order to support the setup of a data session between Application Client and Edge Application Server with a specific QoS and the modification of the QoS of this data session.

The Session with QoS API exposed by the Edge Enabler Server relies on the northbound Policy Authorization Service API exposed by the PCF (Policy Control Function) as specified in 3GPP TS 23.502 V17.0.0 and 3GPP TS 23.503 V17.0.0, the disclosure of which is incorporated by reference herein in its entirety, if the Edge Enabler Server is connected to the PCF via the N5 reference point, or on the northbound AF Session with QoS Service API exposed by the NEF as specified in 3GPP TS 23.502 V17.0.0 and 3GPP TS 23.503 V17.0.0, if the Edge Enabler Server is connected to the PCF via a Network Exposure Function (NEF).

Figure 2:
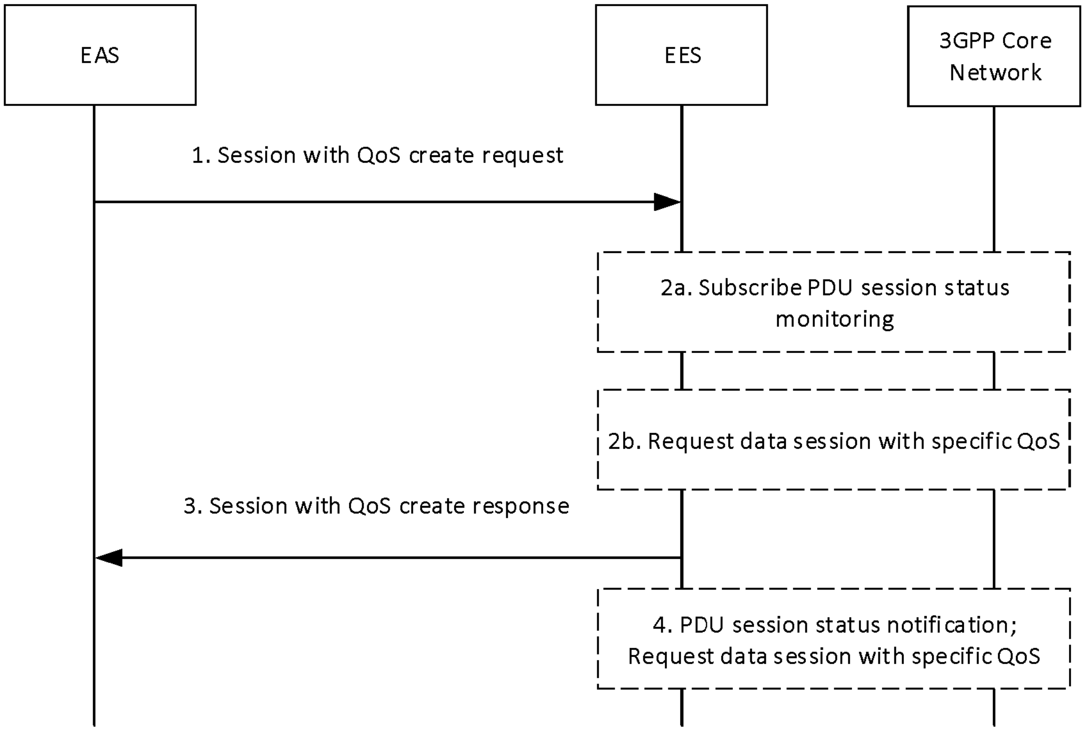
FIG. 2 shows a flowchart of setting up session with QoS create operation between the EAS and the EES.

FIG. 2 shows a flowchart of setting up session with QoS create operation between the EAS and the EES. FIG. 2 is same as FIG. 8.6.6.2.2-1 of 3GPP TS 23.558 V17.0.0. It is used to request reservation of resources for a data session between AC and EAS with a specific QoS and to subscribe to certain session with QoS event notifications.

Step 1. The EAS requests establishment of a data session between the AC and the EAS with a specific QoS (either QoS reference or bandwidth). If the data session can adjust to different QoS parameter combinations, the request may include a list of alternative QoS references in a priority order. The EAS shall include the UE's IP address, UE ID (identifier) or UE Group ID, the DNN (Data Network Name) and S-NSSAI (Single Network Slice Selection Assistance Information) used for the data session between AC and EAS. With the same request the EAS subscribes to receive certain session with QoS event notifications (e.g. notifications related to QoS monitoring, usage monitoring for sponsored data connectivity and/or QoS targets can no longer (or can again) be fulfilled).

Step 2. The EES checks if the EAS is authorized for this operation for the UE. If authorized, then the following services of 3GPP CN (core network) may be used by the EES:

a. the EES invokes the Event Monitoring service for PDU session status with the 3GPP core network, as described in 3GPP TS 23.502 V 17.0.0.
b. the EES invokes the Policy Authorization Create service or the AF Session with QoS service with the 3GPP core network (PCF or NEF, respectively) as described in 3GPP TS 23.501 V 17.0.0 and 3GPP TS 23.502 V 17.0.0, providing the specific QoS (QoS reference or bandwidth) to the PCF as described in 3GPP TS 23.503 V 17.0.0, clause 6.1.3.22. Additionally, the EES may subscribe to notifications of resource allocation outcome and to other events described in clause 6.1.3.18 of 3GPP TS 23.503 V 17.0.0, e.g. notifications of when the QoS targets can no longer (or can again) be fulfilled.

The usage of step 2*a* and step 2*b* is as follows:

If the request is for a group of UEs identified by the UE Group ID or for a single UE identified by the UE ID, then EES executes step 2*a*. If UE (single UE or UE group member) already has ongoing PDU session, then UE IP address is retrieved in step 2*a*. Further the EES executes step 2*b*; otherwise the EES waits for further notification for PDU session status in step 4.

If the request is for a single UE identified by the IP address, then EES executes step 2*b*.

Step 3. If the operation in step 2 is successful, the EES responds with a Context ID and a Result. The Context ID is to be used by the EAS for further requests (e.g. session with QoS update requests) pertaining to the same UE. If the EAS is not authorized or any other failure happens during the operation, the EES provides a rejection response with cause information.

Step 4. When the EES receives the corresponding UE IP (Internet protocol) address for the single UE or UE group member from the PDU session status notification sent by the 3GPP core network, the EES requests data session with specific QoS as described in step 2*b*.

The EES will report the resource allocation outcome, e.g. the successful allocation of the Service Data Flow(s) related to the data session, with a separate session with QoS notify operation (see 3GPP TS 23.503 V 17.0.0, clause 6.1.3.18).

Figure 3:
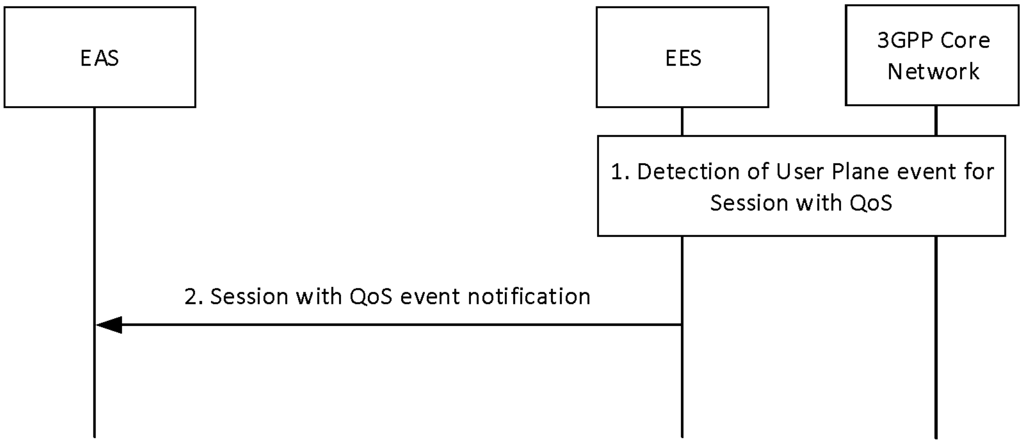
FIG. 3 illustrates a notify operation between the EES and the EAS for session with QoS event notifications.

FIG. 3 illustrates a notify operation between the EES and the EAS for session with QoS event notifications. FIG. 3 is same as FIG. 8.6.6.2.5-1 of 3GPP TS 23.558 V17.0.0.

Step 1. The EES detects a user plane event associated with the established session (i.e. it receives a Policy Authorization Notify operation from the PCC or an AF Session with QoS Notify operation from the NEF as described in 3GPP TS 23.501 V17.0.0 and 3GPP TS 23.502 V17.0.0). The EES determines to notify the session with QoS event notification information (e.g., resource allocation outcome or information that the QoS targets can no longer (or can again) be fulfilled) to the EASs which have subscribed to the session with QoS event notification.

Step 2. The EES sends a session with QoS event notification to the EAS. The EES includes the session with QoS event notification information of the UE.

The existing session with QoS API only supports the IP flow description. For example, Table 1 describes the information elements for a Session with QoS create request from the EAS to the EES. Table 1 is same as Table 8.6.6.3.2-1 of 3GPP TS 23.558 V17.0.0.

Figure 4:
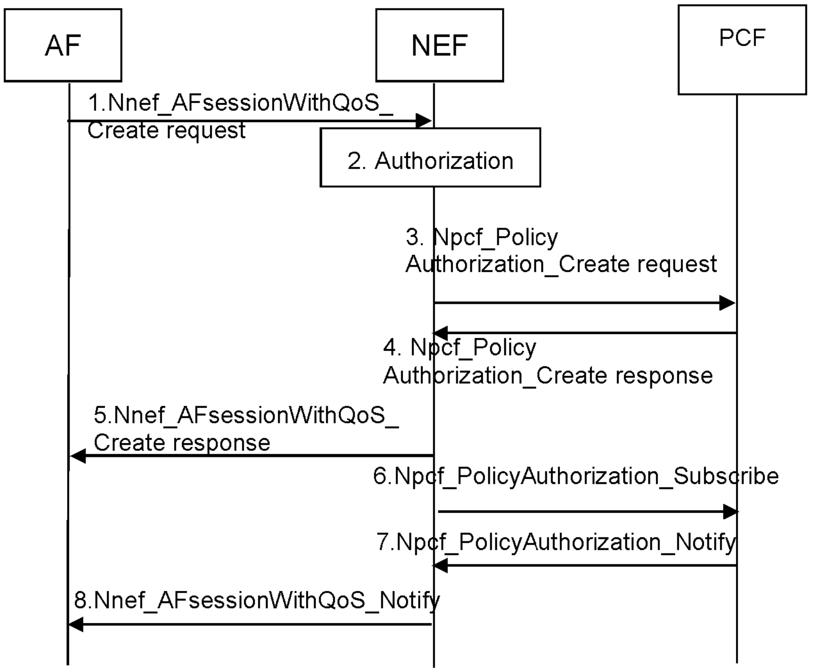
FIG. 4 illustrates a flowchart of setting up an AF session with required QoS procedure.

FIG. 4 is same as FIG. 4.15.6.6-1 of 3GPP TS 23.502 V17.0.0.

Step 1. The AF sends a request to reserve resources for an AF session using Nnef_AFsessionWithQoS_Create request message (UE address, AF Identifier, Flow description(s), QoS reference, (optional) Alternative Service Requirements (containing one or more QoS reference parameters in a prioritized order)) to the NEF. Optionally, a period of time or a traffic volume for the requested QoS can be included in the AF request. The NEF assigns a Transaction Reference ID to the Nnef_AFsessionWithQoS_Create request. The AF may in addition provide the following parameters: Requested 5GS delay, Requested GFBR (Guaranteed Flow Bit Rate), Requested MFBR (Maximum Flow Bit Rate), flow direction, Burst Size (optional), Burst Arrival Time (optional) at UE (uplink) or UPF (User Plane Function) (downlink), Periodicity (optional), Time domain (optional).

The other steps of FIG. 4 have been described in clause 4.15.6.6 of 3GPP TS 23.502 V17.0.0.

TABLE 1

| Information element | Status | Description |
|---|---|---|
| UE IP address (NOTE 1) | O | The UE IP address. |
| UE ID (NOTE 1) | | The identifier of the UE (i.e. GPSI) |
| UE Group ID (NOTE 1) | O | Identifies a group of UEs (i.e. internal group ID or external group ID) |
| IP flow description | M | The IP flow description for the application traffic. |
| Requested QoS reference (NOTE 2) | O | Refers to pre-defined QoS information for the data session between AC and EAS (NOTE 3). |
| List of alternative QoS references | O | A list of alternative QoS references, referring to pre-defined QoS information for the data session between AC and EAS and containing one or more QoS reference parameters in a prioritized order (NOTE 3). |
| Event list | O | A list of associated events to which the EAS subscribes (see 3GPP TS 23.503 [12], clause 6.1.3.18). |
| >Event specific data | O | For usage monitoring: the sponsoring information (sponsor id, ASP id). For QoS monitoring: Target of monitoring (DL, UL or roundtrip packet delay). |
| >Frequency of reporting | O | The reporting frequency (e.g. event triggered) and additional related data (e.g. threshold, minimum waiting time) as described in clause 6.1.3.21 of 3GPP TS 23.503 [12], applicable for QoS monitoring event. |
| Notification Target Address | O | Notification Target Address of the EAS where the notification is to be sent by the EES. |
| DNN | O | DNN for the data session between AC and EAS |
| S-NSSAI | O | S-NSSAI for the data session between AC and EAS |
| Requested bandwidth (NOTE 2) | O | Bandwidth requested for the data session between AC and EAS |

NOTE 1:
Only one of UE IP address, UE ID or UE Group ID shall be provided.
NOTE 2:
Only one of requested QoS reference or requested bandwidth shall be provided.
NOTE 3:
The pre-defined QoS information may be configured in the EES or in the 3GPP core network (see 3GPP TS 23.503 [12], clause 6.1.3.22).

As shown in Table 1, only IP (Internet protocol) flow description is supported in the Session with QoS create request from the EAS to the EES. IP flow description may represent a 3-tuple with protocol, server IP and server port for UL(uplink)/DL(downlink) application traffic Nowadays, the encrypted traffic volume (e.g. HTTPS (Hypertext Transfer Protocol Secure)) is increasing rapidly year by year in Internet. IP flow description can not support traffic filter for encrypted traffic (such as HTTPS traffic), which may make the Edge-3 QoS API less attractive to the EAS developer. In addition, several application services may be deployed on the same EAS, which means the EAS exposes the same IP address and port (e.g. port number 443 for HTTPS), which makes the IP flow description impossible to distinguish different application services on the same EAS.

FIG. 4 illustrates a flowchart of setting up an AF session with required QoS procedure.

Figure 5:
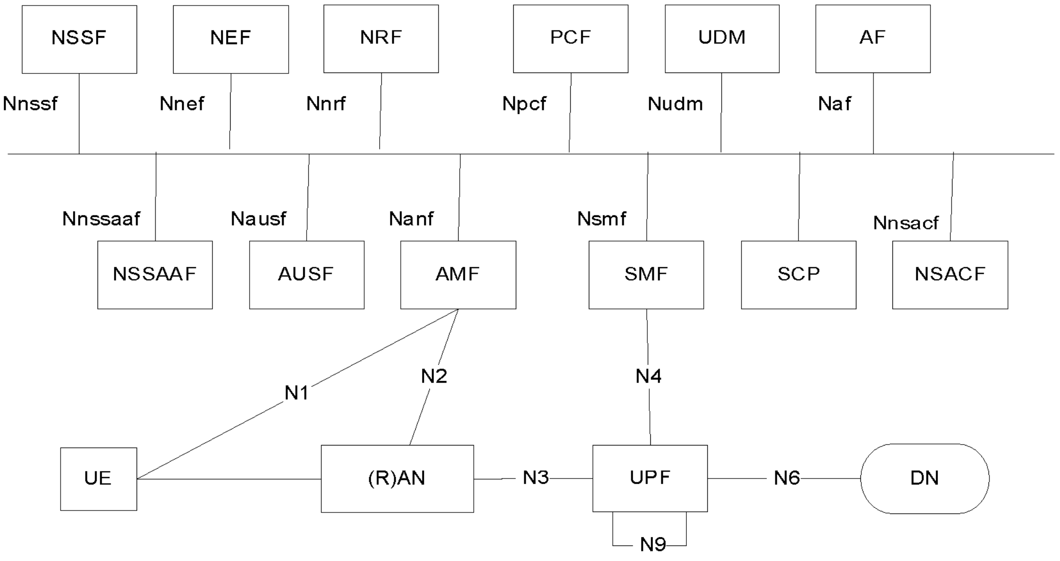
FIG. 5 schematically shows a high level architecture in the fifth generation network according to an embodiment of the present disclosure.
Figure 6:
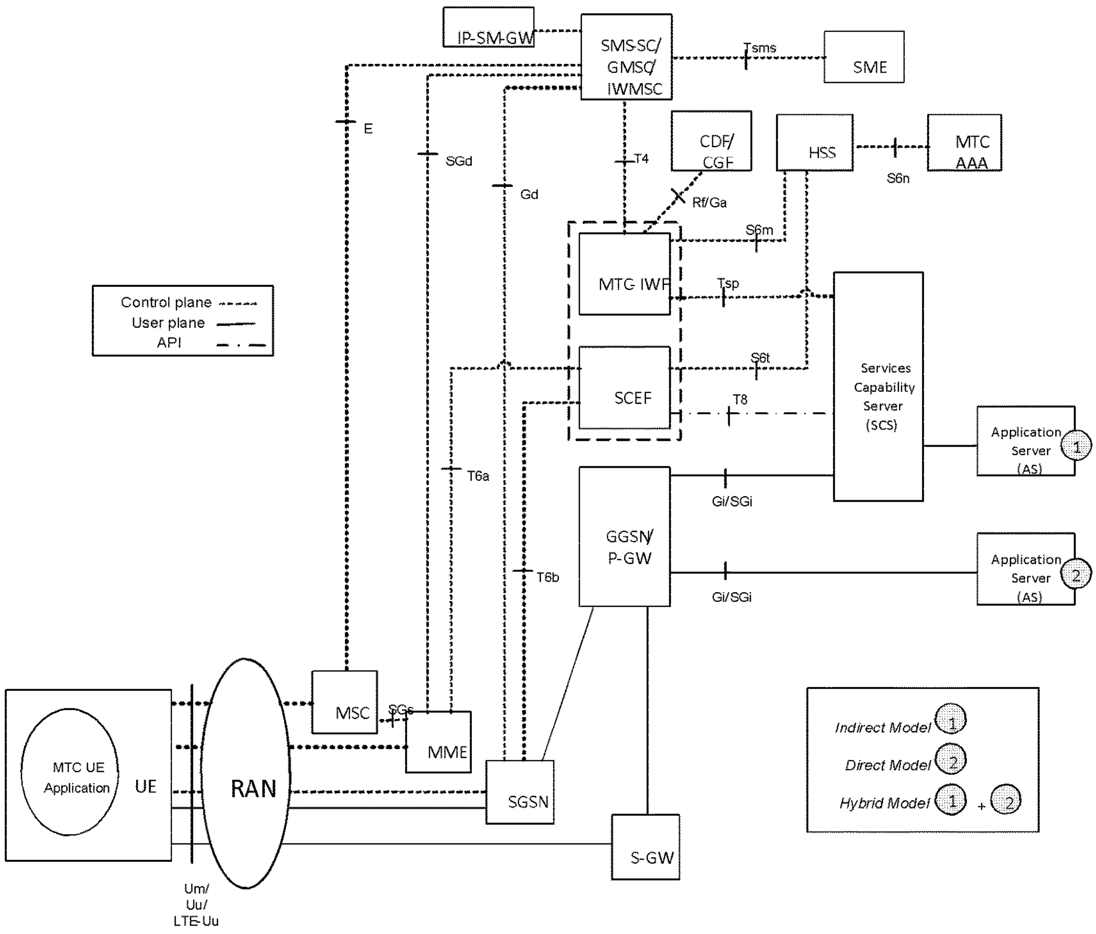
FIG. 6 schematically shows system architecture in a 4G network according to an embodiment of the present disclosure.

Although the subject matter described herein may be implemented in any appropriate type of system using any suitable components, the embodiments disclosed herein are described in relation to a communication system complied with the exemplary system architectures illustrated in FIGS. 5-6. For simplicity, the system architectures of FIGS. 5-6 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 5 schematically shows a high level architecture in the fifth generation network according to an embodiment of the present disclosure. For example, the fifth generation network may be 5GS. The architecture of FIG. 5 is same as FIG. 4.2.3-1 as described in 3GPP TS 23.501 V17.0.0, the disclosure of which is incorporated by reference herein in its entirety. The system architecture of FIG. 5 may comprise some exemplary elements such as AUSF, AMF, DN (data network), NEF, NRF, NSSF, PCF, SMF, UDM, UPF, AF, UE, (R)AN, SCP (Service Communication Proxy), NSSAAF (Network Slice-Specific Authentication and Authorization Function), NSACF (Network Slice Admission Control Function), etc.

In accordance with an exemplary embodiment, the UE can establish a signaling connection with the AMF over the reference point N1, as illustrated in FIG. 5. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 5, the exemplary system architecture also contains the service-based interfaces such as Nnrf, Nnef, Nausf, Nudm, Npcf, Namf, Nnsacf and Nsmf exhibited by NFs such as the NRF, the NEF, the AUSF, the UDM, the PCF, the AMF, the NSACF and the SMF. In addition, FIG. 5 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 5 may be responsible for functions such as session management, mobility management, authentication, security, etc. The AUSF, AMF, DN, NEF, NRF, NSSF, PCF, SMF, UDM, UPF, AF, UE, (R)AN, SCP, NSACF may include the functionality for example as defined in clause 6.2 of 3GPP TS 23.501 V17.0.0.

FIG. 6 schematically shows system architecture in a 4G network according to an embodiment of the present disclosure, which is the same as FIG. 4.2-1a of 3GPP TS 23.682 V16.9.0, the disclosure of which is incorporated by reference herein in its entirety. The system architecture of FIG. 6 may comprise some exemplary elements such as Services Capability Server (SCS), Application Server (AS), SCEF (Service Capability Exposure Function), HSS, UE, RAN (Radio Access Network), SGSN (Serving GPRS (General Packet Radio Service) Support Node), MME, MSC (Mobile Switching Centre), S-GW (Serving Gateway), GGSN/P-GW (Gateway GPRS Support Node/PDN (Packet Data Network) Gateway), MTC-IWF (Machine Type Communications-InterWorking Function) CDF/CGF (Charging Data Function/Charging Gateway Function), MTC-AAA (Machine Type Communications-authentication, authorization and accounting), SMS-SC/GMSC/IWMSC(Short Message Service-Service Centre/Gateway MSC/InterWorking MSC) IP-SM-GW (Internet protocol Short Message Gateway). The network elements and interfaces as shown in FIG. 6 may be same as the corresponding network elements and interfaces as described in 3GPP TS 23.682 V16.9.0.

The system architecture shows the architecture for a UE used for MTC connecting to the 3GPP network (UTRAN (Universal Terrestrial Radio Access Network), E-UTRAN (Evolved UTRAN), GERAN (GSM EDGE (Enhanced Data rates for GSM Evolution) Radio Access Network), etc.) via the Um/Uu/LTE-Uu interfaces. The system architecture also shows the 3GPP network service capability exposure to SCS and AS.

As further illustrated in FIG. 6, the exemplary system architecture also contains various reference points.

Tsms: Reference point used by an entity outside the 3GPP network to communicate with UEs used for MTC via SMS (Short Message Service).

Tsp: Reference point used by a SCS to communicate with the MTC-IWF related control plane signalling.

T4: Reference point used between MTC-IWF and the SMS-SC in the HPLMN.

T6a: Reference point used between SCEF and serving MME.

T6b: Reference point used between SCEF and serving SGSN.

T8: Reference point used between the SCEF and the SCS/AS.

Som: Reference point used by MTC-IWF to interrogate HSS/HLR (Home Location Register).

Son: Reference point used by MTC-AAA to interrogate HSS/HLR.

S6t: Reference point used between SCEF and HSS.

SGs: Reference point used between MSC and MME.

Gi/SGi: Reference point used between GGSN/P-GW and application server and between GGSN/P-GW and SCS.

Rf/Ga: Reference point used between MTC-IWF and CDF/CGF.

Gd: Reference point used between SMS-SC/GMSC/IWMSC and SGSN.

SGd: Reference point used between SMS-SC/GMSC/IWMSC and MME.

E: Reference point used between SMS-SC/GMSC/IWMSC and MSC.

The end-to-end communications, between the MTC Application in the UE and the MTC Application in the external network, uses services provided by the 3GPP system, and optionally services provided by a Services Capability Server (SCS).

The MTC Application in the external network is typically hosted by an Application Server (AS) and may make use of an SCS for additional value added services. The 3GPP system provides transport, subscriber management and other communication services including various architectural enhancements motivated by, but not restricted to, MTC (e.g. control plane device triggering).

Different models are foreseen for machine type of traffic in what relates to the communication between the AS and the 3GPP system and based on the provider of the SCS. The different architectural models that are supported by the Architectural Reference model include the Direct model, Indirect model and Hybrid model as described in 3GPP TS 23.682 V16.9.0.

Figure 7:
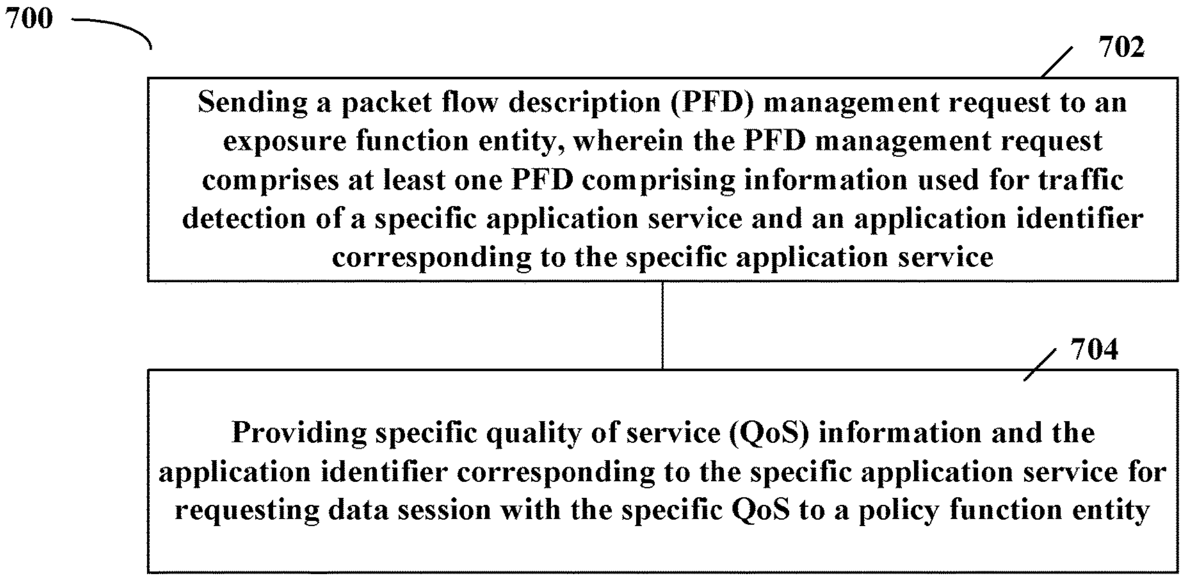
FIG. 7 shows a flowchart of a method according to an embodiment of the present disclosure.

FIG. 7 shows a flowchart of a method according to an embodiment of the present disclosure, which may be performed by an apparatus implemented in or at or as a server or communicatively coupled to the server. As such, the apparatus may provide means or modules for accomplishing various parts of the method 700 as well as means or modules for accomplishing other processes in conjunction with other components.

At block 702, the server may send a packet flow description (PFD) management request to an exposure function entity. The PFD management request may comprise at least one PFD comprising information used for traffic detection of a specific application service and an application identifier corresponding to the specific application service. The application identifier corresponding to the specific application service may be received from a network node (such as EAS) or determined by the server for example based on a local policy.

The server may be any suitable server. In an embodiment, the server may comprise at least one of an edge enabler server or application server (such as AF, EAS, etc.).

The exposure function entity may be any suitable network function which can support exposure of capabilities and events, secure provision of information from external application to a core network, etc. In an embodiment, the exposure function entity may comprise at least one of network exposure function (NEF) or service capability exposure function (SCEF). It is noted that NEF may be combined with SCEF.

The PFD management request may be used by the server to provision or remove one or more PFD(s) belonging to an application identifier in a core network node such as Unified Data Repository (UDR). PFD sets belonging to different application identifiers can be managed with the same PFD management request message.

The PFD may further comprise any other suitable information such as PFD ID, dnProtocol, etc. PFD ID identifies a PFD of an application identifier. dnProtocol indicates the additional protocol and protocol field for domain names to be matched. dnProtocol may only be provided when domain names attribute is present in the PFD.

In an embodiment, the PFD may be same as the definition of type Pfd as described in 3GPP TS 29.122 V17.1.0.

The information used for traffic detection of the specific application service may comprise any suitable information which can be used for traffic detection of the specific application service. In an embodiment, the information used for traffic detection of the specific application service may comprise at least one of a domain name or a uniform resource locator (URL). The domain name may indicate an FQDN (Fully Qualified Domain Name) or a regular expression as a domain name matching criteria. The URL may indicate a URL or a regular expression which is used to match the significant parts of the URL.

In an embodiment, the domain name may be the domain name for the application traffic and the applicable protocol. For example, the domain name may be Transport Layer Security Server Name Indication (TLS SNI).

In an embodiment, the traffic detection of the specific application service comprises encrypted traffic detection of the specific application service.

In an embodiment, the traffic detection of the specific application service comprises unencrypted traffic detection of the specific application service.

In an embodiment, the PFD management request may be Nnef_PFDManagement_Create request or Nnef_PFDManagement_Update request as described in 3GPP TS 23.502 V 17.0.0.

At block 704, the server may provide specific quality of service (QoS) information and the application identifier corresponding to the specific application service for requesting data session with the specific QoS to a policy function entity. The QoS information may take any suitable forms. For example, the server may provide a QoS reference which may identify a pre-defined QoS information.

The policy function entity may be an entity which can provide policy rule(s) to control plane function(s) to enforce them. In an embodiment, the policy function entity may comprise at least one of policy control function (PCF) or policy and charging rules function (PCRF).

The server may provide the specific QoS information and the application identifier corresponding to the specific application service for requesting data session with the specific QoS to the policy function entity in various ways.

In an embodiment, the server may directly send a message comprising the specific QoS information and the application identifier corresponding to the specific application service for requesting data session with the specific QoS to the policy function entity. For example if the server is an entity trusted by the core network, the server may invoke core network function APIs directly to provide the specific QoS information and the application identifier corresponding to the specific application service for requesting data session with the specific QoS to the policy function entity.

In an embodiment, when the server is EAS, the server may invoke 3GPP core network capabilities through the EES to provide the specific QoS information and the application identifier corresponding to the specific application service to the policy function entity.

In an embodiment, the server may invoke the 3GPP core network capability through the exposure function entity (i.e. SCEF or NEF) to provide the specific QoS information and the application identifier corresponding to the specific application service to the policy function entity.

In an embodiment, the server may invokes the Policy Authorization Create service or the AF Session with QoS service with the 3GPP core network (PCF or NEF, respectively) as described in 3GPP TS 23.501 V17.0.0 and 3GPP TS 23.502 V17.0.0, providing the specific QoS (QoS reference or bandwidth) to the PCF as described in 3GPP TS 23.503 V17.0.0, clause 6.1.3.22. Additionally, the server may subscribe to notifications of resource allocation outcome and to other events described in clause 6.1.3.18 of 3GPP TS 23.503 V17.0.0, e.g. notifications of when the QoS targets can no longer (or can again) be fulfilled.

For example, at least one of Npcf_PolicyAuthorization_Create request message, Npcf_PolicyAuthorization_Update request message, Nnef_AFsessionWithQoS_Create request message, Nnef_AFsessionWithQoS_Update request message as described in 3GPP TS 23.502 V17.0.0 may be used in block 704 to provide the specific QoS information and the application identifier corresponding to the specific application service for requesting data session with the specific QoS to the policy function entity.

In an embodiment, the server may further provide the information used for traffic detection of the specific application service to the policy function entity at block 704.

Figure 8:
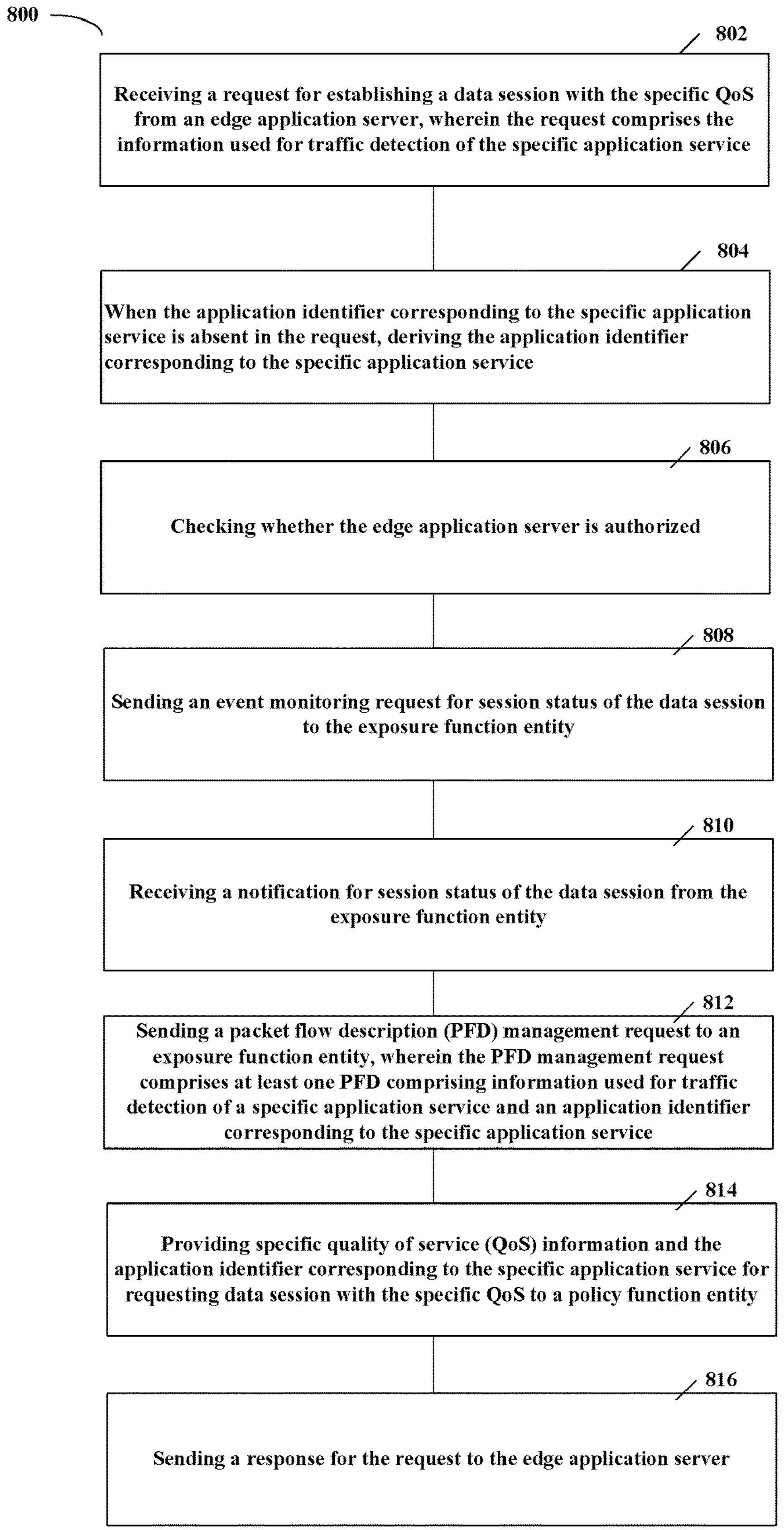
FIG. 8 shows a flowchart of a method according to another embodiment of the present disclosure.

FIG. 8 shows a flowchart of a method according to another embodiment of the present disclosure, which may be performed by an apparatus implemented in or at or as a server or communicatively coupled to the server. As such, the apparatus may provide means or modules for accomplishing various parts of the method 800 as well as means or modules for accomplishing other processes in conjunction with other components. For some parts which have been described in the above embodiments, the description thereof is omitted here for brevity. In this embodiment, the server may be EES.

At block 802, the server may receive a request for establishing a data session with the specific QoS from an edge application server. The request comprises the information used for traffic detection of the specific application service.

In an embodiment, the data session comprises a protocol data unit (PDU) data session between an application client and the edge application server.

In an embodiment, the request further comprises the application identifier corresponding to the specific application service.

At block 804, when the application identifier corresponding to the specific application service is absent in the request, the server may derive the application identifier corresponding to the specific application service. For example, the server may derive the application identifier corresponding to the specific application service based on local policy. As another embodiment, the server may maintain a mapping table between the information used for traffic detection of the specific application service information and the application identifier corresponding to the specific application service. The server may derive the application identifier corresponding to the specific application service based on the mapping table.

At block 806, the server may check whether the edge application server is authorized. For example, when the edge application server is authorized, the edge application server may perform blocks 808, 810, 812, 814 and 816, otherwise the request may be rejected and the method 800 may go to block 816.

At block 808, when the request is for a group of use equipments (UEs) identified by a UE group identifier (ID) or for a single UE identified by a UE ID, the server may send an event monitoring request for session status of the data session to the exposure function entity.

At block 810, the server may receive a notification for session status of the data session from the exposure function entity.

At block 812, the server may send a packet flow description (PFD) management request to an exposure function entity. The PFD management request comprises at least one PFD comprising information used for traffic detection of a specific application service and an application identifier corresponding to the specific application service At block 814, the server may provide specific quality of service (QoS) information and the application identifier corresponding to the specific application service for requesting data session with the specific QoS to a policy function entity. In an embodiment, the server may further provide the information used for traffic detection of the specific application service to the policy function entity.

At block 816, the server may send a response for the request to the edge application server. For example, if the operation in blocks 812 and 814 is successful, the server responds with a context ID and a Result. The context ID is to be used by the EAS for further requests (e.g. session with QoS update requests) pertaining to the same UE. If the EAS is not authorized or any other failure happens during the operation in blocks 812 and 814, the server provides a rejection response with cause information.

Figure 9:
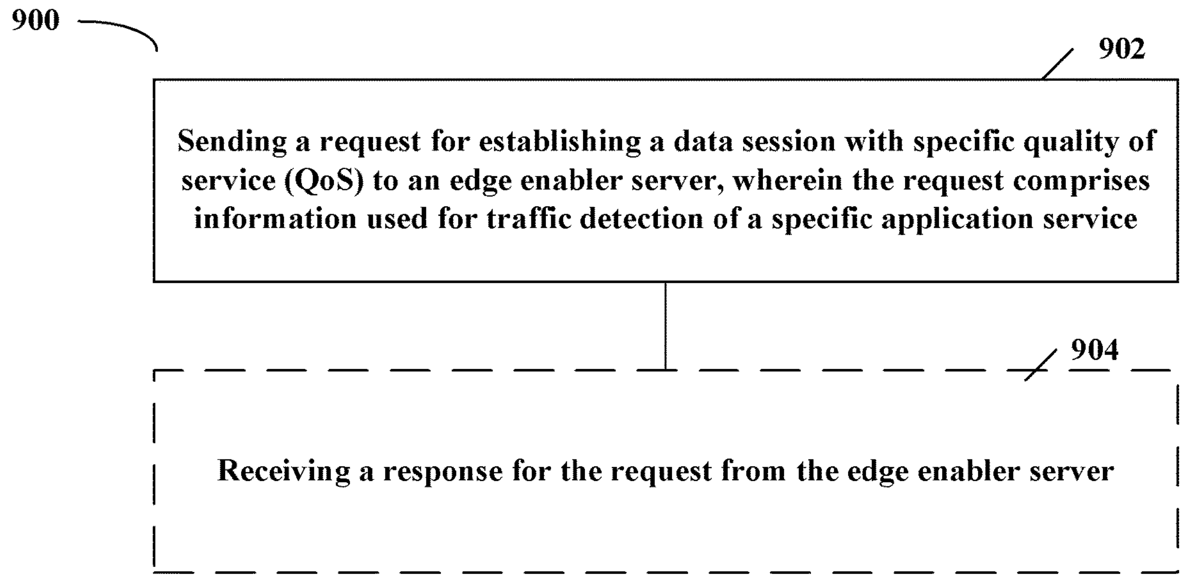
FIG. 9 shows a flowchart of a method according to another embodiment of the present disclosure.

FIG. 9 shows a flowchart of a method according to another embodiment of the present disclosure, which may be performed by an apparatus implemented in or at or as an edge application server or communicatively coupled to the edge application server. As such, the apparatus may provide means or modules for accomplishing various parts of the method 900 as well as means or modules for accomplishing other processes in conjunction with other components. For some parts which have been described in the above embodiments, the description thereof is omitted here for brevity.

At block 902, the edge application server may send a request for establishing a data session with a specific QoS to an edge enabler server. The request comprises information used for traffic detection of a specific application service.

At block 904, optionally, the edge application server may receive a response for the request from the edge enabler server.

Figure 10:
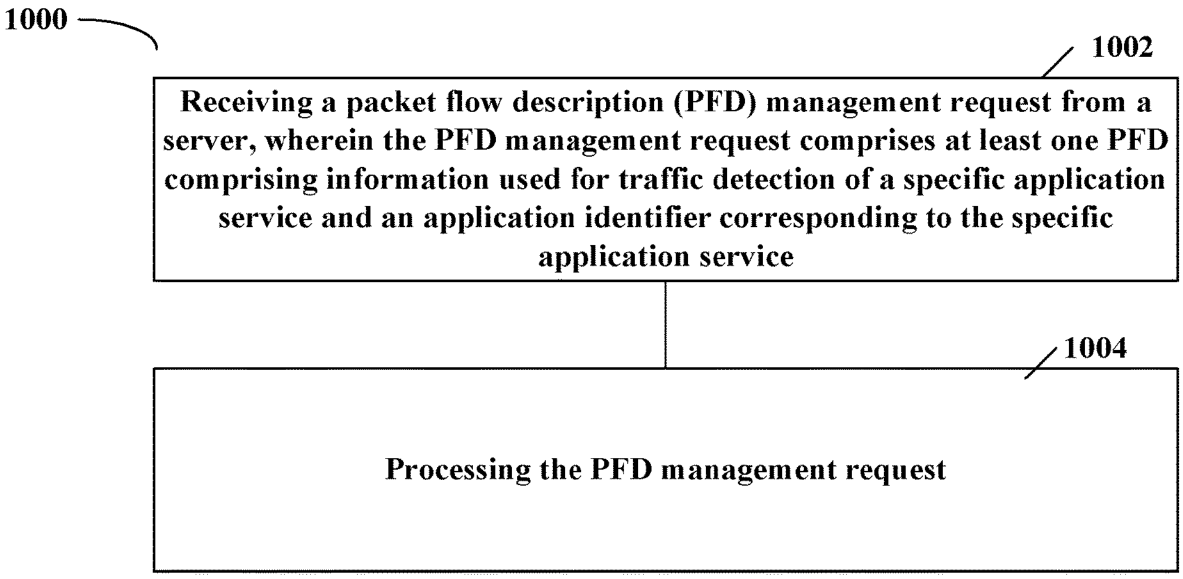
FIG. 10 shows a flowchart of a method according to another embodiment of the present disclosure.

FIG. 10 shows a flowchart of a method according to another embodiment of the present disclosure, which may be performed by an apparatus implemented in or at or as an exposure function entity or communicatively coupled to the exposure function entity. As such, the apparatus may provide means or modules for accomplishing various parts of the method 1000 as well as means or modules for accomplishing other processes in conjunction with other components. For some parts which have been described in the above embodiments, the description thereof is omitted here for brevity.

At block 1002, the exposure function entity may receive a packet flow description (PFD) management request from a server. The PFD management request comprises at least one PFD comprising information used for traffic detection of a specific application service and an application identifier corresponding to the specific application service.

At block 1004, the exposure function entity may process the PFD management request. For example, the exposure function entity may process the PFD management request as described in clause 4.18.2 of 3GPP TS 23.502 V 17.0.0.

Figure 11:
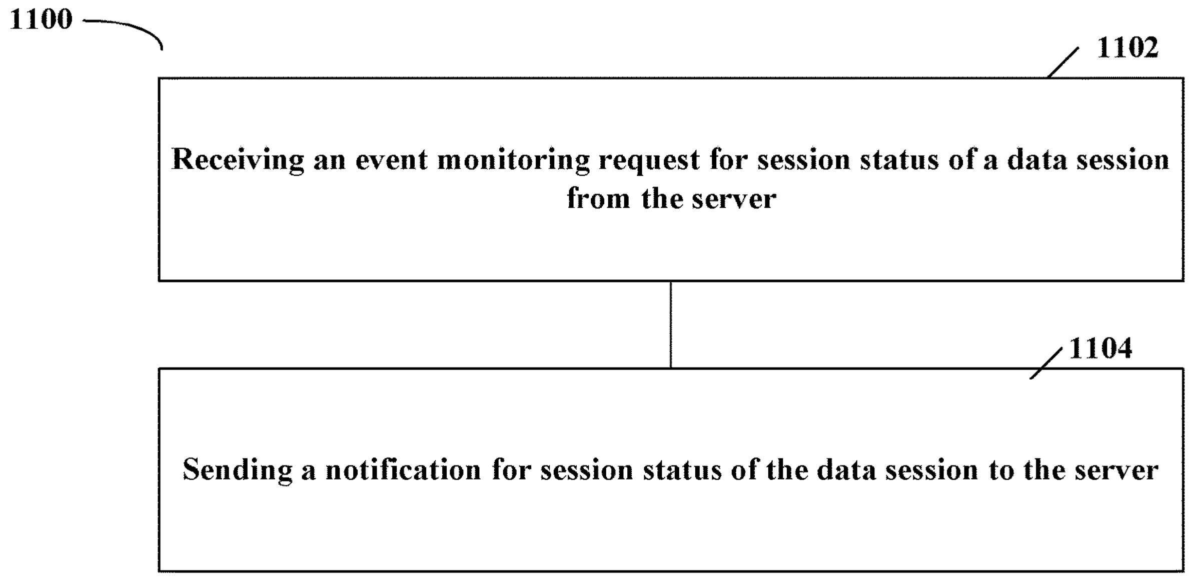
FIG. 11 shows a flowchart of a method according to another embodiment of the present disclosure.

FIG. 11 shows a flowchart of a method according to another embodiment of the present disclosure, which may be performed by an apparatus implemented in or at or as an exposure function entity or communicatively coupled to the exposure function entity. As such, the apparatus may provide means or modules for accomplishing various parts of the method 1100 as well as means or modules for accomplishing other processes in conjunction with other components. For some parts which have been described in the above embodiments, the description thereof is omitted here for brevity.

At block 1102, the exposure function entity may receive an event monitoring request for session status of a data session from the server. For example, the server may send the event monitoring request at block 808 of FIG. 8, and then the exposure function entity may receive the event monitoring request from the server At block 1104, the exposure function entity may send a notification for session status of the data session to the server.

For example, when the exposure function entity is NEF, the exposure function entity may use Nnef_EventExposure_subscribe request as described in clause 4.15.3.2.3 of 3GPP TS 23.502 V 17.0.0 to subscribe to notifications for session status of the data session.

Figure 12:
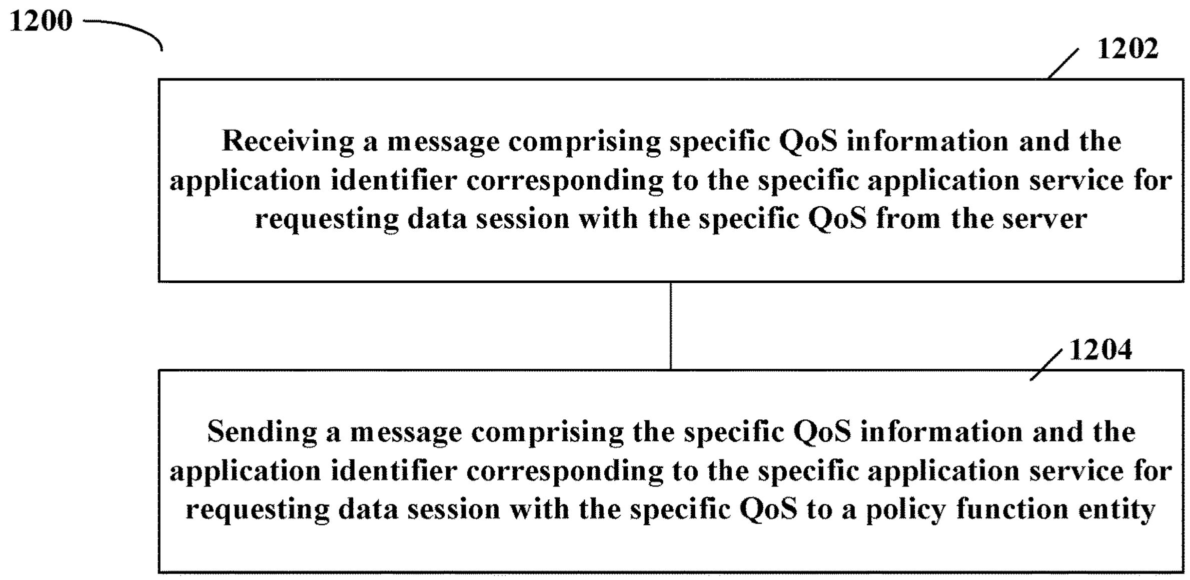
FIG. 12 shows a flowchart of a method according to another embodiment of the present disclosure.

FIG. 12 shows a flowchart of a method according to another embodiment of the present disclosure, which may be performed by an apparatus implemented in or at or as an exposure function entity or communicatively coupled to the exposure function entity. As such, the apparatus may provide means or modules for accomplishing various parts of the method 1200 as well as means or modules for accomplishing other processes in conjunction with other components. For some parts which have been described in the above embodiments, the description thereof is omitted here for brevity.

At block 1202, the exposure function entity may receive a message comprising specific QoS information and the application identifier corresponding to the specific application service for requesting data session with the specific QoS from the server.

At block 1204, the exposure function entity may send a message comprising the specific QoS information and the application identifier corresponding to the specific application service for requesting data session with the specific QoS to a policy function entity.

For example, the exposure function entity may receive Nnef_AFsessionWithQoS_Create request message comprises the specific QoS information and the application identifier corresponding to the specific application service from the server. The exposure function entity may authorize the Nnef_AFsessionWithQoS_Create request and may apply policies to control the overall amount of pre-defined QoS authorized for the server. If the authorisation is not granted, the exposure function entity may replies to the server with a result value indicating that the authorisation failed. If the authorisation is granted, the exposure function entity interacts with the policy function entity by triggering a Npcf_PolicyAuthorization_Create request and provides UE address, AF Identifier, Flow description(s), the QoS reference and the optional Alternative Service Requirements (containing one or more QoS reference parameters in a prioritized order). Any optionally received period of time or traffic volume is also included and mapped to sponsored data connectivity information.

In an embodiment, the exposure function entity may further send the information used for traffic detection of the specific application service to the policy function entity at block 1204.

According to various embodiments, it proposed to add domain name for encrypted traffic filter for QoS API. The current definition of QoS API only allows IP flow description, nowadays, the encrypted traffic volume (e.g. HTTPS) is increasing rapidly year by year in Internet. Not supporting traffic filter for encrypted traffic will make the Edge-3 QoS API less attractive to the EAS developer. With the support of application ID in setting up required QoS, the AF can provide application ID for identifying detailed traffic flow filter. This allows traffic filters other than IP 5-tuple to be provided by the AF. The EAS should be able to provide domain name for encrypted traffic detection in QoS API.

In an embodiment, 3GPP TS 23.558 V17.0.0 may be amended as following.

8.6.6.2.2 Create a Session

Figure 13:
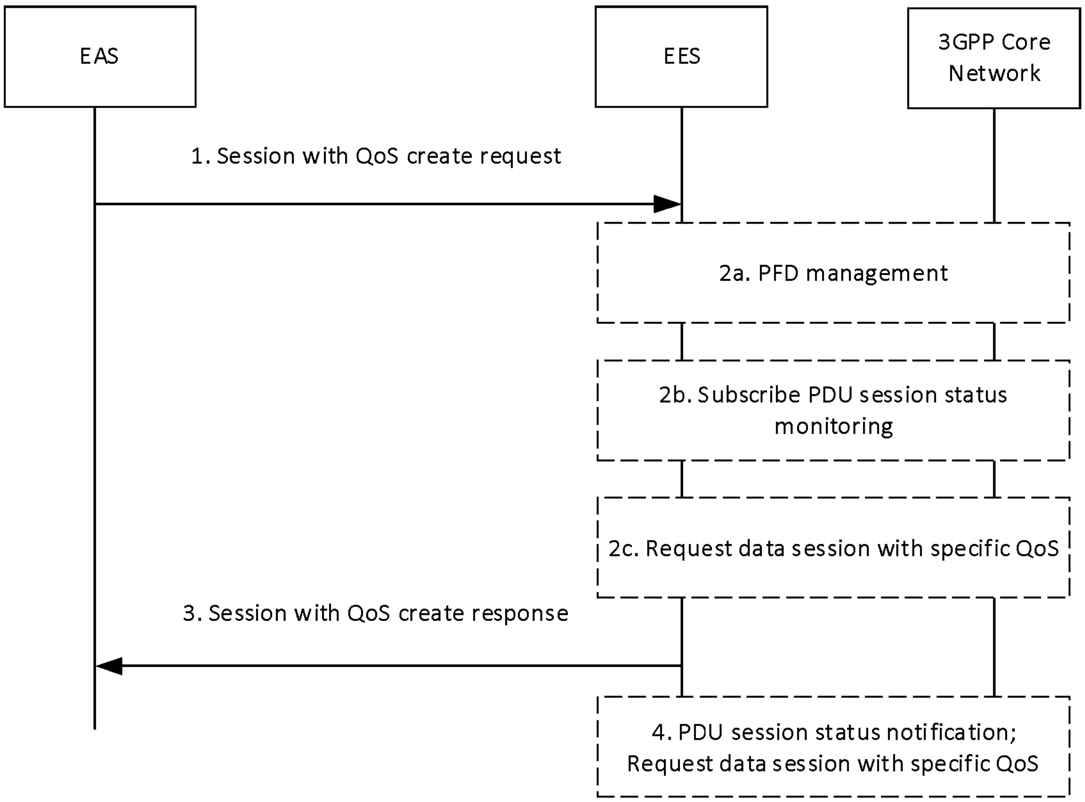
FIG. 13 illustrates the session with QoS create operation between the EAS and the EES according to an embodiment of the present disclosure.

FIG. 13 illustrates the session with QoS create operation between the EAS and the EES according to an embodiment of the present disclosure. It is used to request reservation of resources for a data session between AC and EAS with a specific QoS and to subscribe to certain session with QoS event notifications.

Step 1. The EAS requests establishment of a data session between the AC and the EAS with a specific QoS (either QoS reference or bandwidth). If the data session can adjust to different QoS parameter combinations, the request may include a list of alternative QoS references in a priority order. The EAS shall include the UE's IP address, UE ID or UE Group ID, the DNN and S-NSSAI used for the data session between AC and EAS. With the same request the EAS subscribes to receive certain session with QoS event notifications (e.g. notifications related to QoS monitoring, usage monitoring for sponsored data connectivity and/or QoS targets can no longer (or can again) be fulfilled).

Step 2. The EES checks if the EAS is authorized for this operation for the UE. If authorized, then the following services of 3GPP CN may be used by the EES:

Step 2*a*. the EES invokes the PFD management procedure with the 3GPP core network, as described in 3GPP TS 23.502 [3].

Step 2*b*. the EES invokes the Event Monitoring service for PDU session status with the 3GPP core network, as described in 3GPP TS 23.502 [3].

Step 2*c*. the EES invokes the Policy Authorization Create service or the AF Session with QoS service with the 3GPP core network (PCF or NEF, respectively) as described in 3GPP TS 23.501 V17.0.0 and 3GPP TS 23.502 V17.0.0, providing the specific QoS (QoS reference or bandwidth) to the PCF as described in 3GPP TS 23.503 V17.0.0, clause 6.1.3.22. Additionally, the EES may subscribe to notifications of resource allocation outcome and to other events described in clause 6.1.3.18 of 3GPP TS 23.503 V17.0.0, e.g. notifications of when the QoS targets can no longer (or can again) be fulfilled.

The usage of step 2*a*, 2*b* and step 2*c* of FIG. 13 is as follows:

- If the request includes domain name, the EES either uses the received application id or derives the application id by local policy (if the application id is absent) and executes step 2*a* of FIG. 13 in order to provision the application ID and the associated domain name to the 3GPP core network. Further the EES provides the same application id for requesting data session with specific QoS in step 2*c* or step 4 of FIG. 13.
- If the request is for a group of UEs identified by the UE Group ID or for a single UE identified by the UE ID, then EES executes step 2*b* of FIG. 13. If UE (single UE or UE group member) already has ongoing PDU session, then UE IP address is retrieved in step 2*b* of FIG. 13. Further the EES executes step 2*c* of FIG. 13; otherwise the EES waits for further notification for PDU session status in step 4 of FIG. 13.
- If the request is for a single UE identified by the IP address, then EES executes step 2*c*.

Step 3. If the operation in step 2 of FIG. 13 is successful, the EES responds with a Context ID and a Result. The Context ID is to be used by the EAS for further requests (e.g. session with QoS update requests) pertaining to the same UE. If the EAS is not authorized or any other failure happens during the operation, the EES provides a rejection response with cause information.

Step 4. When the EES receives the corresponding UE IP address for the single UE or UE group member from the PDU session status notification sent by the 3GPP core network, the EES requests data session with specific QoS as described in step 2*c* of FIG. 13.

NOTE: The EES will report the resource allocation outcome, e.g. the successful allocation of the Service Data Flow(s) related to the data session, with a separate session with QoS notify operation (see TS 23.503 V17.0.0, clause 6.1.3.18).

8.6.6.3.2 Session with QoS Create Request

Table 8.6.6.3.2-1 describes the information elements for a Session with QoS create request from the EAS to the EES.

TABLE 8.6.6.3.2-1

Session with QoS create request

| Information element | Status | Description |
|---|---|---|
| UE IP address (NOTE 1) | O | The UE IP address. |
| UE ID (NOTE 1) | O | The identifier of the UE (i.e. GPSI) |
| UE Group ID (NOTE 1) | O | Identifies a group of UEs (i.e. internal group ID or external group ID) |
| IP flow description (NOTE x) | O | The IP flow description for the application traffic. |
| Domain name (NOTE x) | O | The domain name for the application traffic and the applicable protocol (e.g. TLS SNI). |
| Application id | O | The application identifier. |
| Requested QoS reference (NOTE 2) | O | Refers to pre-defined QoS information for the data session between AC and EAS (NOTE 3). |
| List of alternative QoS references | O | A list of alternative QoS references, referring to pre-defined QoS information for the data session between AC and EAS and containing one or more QoS reference parameters in a prioritized order (NOTE 3). |
| Event list | O | A list of associated events to which the EAS subscribes (see 3GPP TS 23.503 [12], clause 6.1.3.18). |
| >Event specific data | O | For usage monitoring: the sponsoring information (sponsor id, ASP id).<br>For QoS monitoring: Target of monitoring (DL, UL or roundtrip packet delay). |
| >Frequency of reporting | O | The reporting frequency (e.g. event triggered) and additional related data (e.g. threshold, minimum waiting time) as described in clause 6.1.3.21 of 3GPP TS 23.503 [12], applicable for QoS monitoring event. |
| Notification Target Address | O | Notification Target Address of the EAS where the notification is to be sent by the EES. |
| DNN | O | DNN for the data session between AC and EAS |
| S-NSSAI | O | S-NSSAI for the data session between AC and EAS |
| Requested bandwidth (NOTE 2) | O | Bandwidth requested for the data session between AC and EAS |

NOTE 1:
Only one of UE IP address, UE ID or UE Group ID shall be provided.
NOTE 2:
Either requested QoS reference or requested bandwidth shall be provided.
NOTE x:
The pre-defined QoS information may be configured in the EES or in the 3GPP core network (see 3GPP TS 23.503 [12], clause 6.1.3.22).
NOTE x:
Either IP flow description or domain name shall be provided.

8.6.6.3.4 Session with QoS Update Request

Table 8.6.6.3.4-1 describes the information elements for a Session with QoS update request from the EAS to the EES.

TABLE 8.6.6.3.4-1

Session with QoS update request

| Information element | Status | Description |
|---|---|---|
| Context ID | M | Context identifier corresponding to the information stored for the request in the EES. |
| Requested QoS reference (NOTE 1) | O | Refers to pre-defined QoS information for the data session between AC and EAS (NOTE 2). |
| List of alternative QoS references | O | A list of alternative QoS references, referring to pre-defined QoS information for the data session between AC and EAS and containing one or more QoS reference parameters in a prioritized order (NOTE 2). |
| Event list | O | A list of associated events to which the EAS subscribes (see 3GPP TS 23.503 [12], clause 6.1.3.18). |
| >Event specific data | O | For usage monitoring: the sponsoring information (sponsor id, ASP id).<br>For QoS monitoring: Target of monitoring (DL, UL or roundtrip packet delay). |
| >Frequency of reporting | O | The reporting frequency (e.g. event triggered) and additional related data (e.g. threshold, minimum waiting time) as described in clause 6.1.3.21 of 3GPP TS 23.503 [12], applicable for QoS monitoring event. |

TABLE 8.6.6.3.4-1-continued

Session with QoS update request

| Information element | Status | Description |
| --- | --- | --- |
| Requested bandwidth (NOTE 1) | O | Bandwidth requested for the data session between AC and EAS |

NOTE 1:
Either requested QoS reference or requested bandwidth shall be provided.
NOTE 2:
The pre-defined QoS information may be configured in the EES or in the 3GPP core network (see 3GPP TS 23.503 [12], clause 6.1.3.22).

8.9.3 Capabilities Utilized by EES

When required, the EES may utilize:

- user plane path management events by subscribing with the 3GPP core network for the user plane path management event notifications of the UE as described in 3GPP TS 23.501 V17.0.0 and 3GPP TS 23.502 V17.0.0;
- the location information from the API exposed by 3GPP core network, e.g. SCEF/NEF/SCEF+NEF or LCS (Location Service) as specified in 3GPP TS 23.682, 3GPP TS 23.502 V17.0.0, 3GPP TS 23.271, 3GPP TS 36.305, 3GPP TS 23.273 and 3GPP TS 38.305 to obtain the UE's location from the 3GPP core network;
- capabilities exposed by the 3GPP core network, e.g. NEF or PCF, to establish an AF session with QoS, and QoS related event notifications subscribed with the 3GPP core network as specified in 3GPP TS 23.501 V17.0.0, 3GPP TS 23.502 V17.0.0 and 3GPP TS 23.503 V17.0.0;
- the PFD management capability exposed by the 3GPP core network as specified in 3GPP TS 23.501 V17.0.0, 3GPP TS 23.502 V17.0.0 and 3GPP TS 23.503 V17.0.0;
- capabilities exposed by the 3GPP core network, e.g. NEF or NWDAF, to analyse UE expected behaviour as specified in 3GPP TS 23.288; and
- the monitoring capability exposed by the 3GPP core network as specified in 3GPP TS 23.501 V17.0.0 and 3GPP TS 23.502 V17.0.0.

The various blocks/steps shown in above Figures may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Embodiments herein afford many advantages, of which a non-exhaustive list of examples follows. Some embodiments herein may support traffic filter for encrypted traffic (such as HTTPS traffic). Some embodiments herein may enable (encrypted) traffic detection of a specific application service. Some embodiments herein may provide domain name for encrypted traffic detection in QoS API. Some embodiments herein provide domain name to distinguish different application services. The embodiments herein are not limited to the features and advantages mentioned above. A person skilled in the art will recognize additional features and advantages upon reading the following detailed description.

Figure 14:
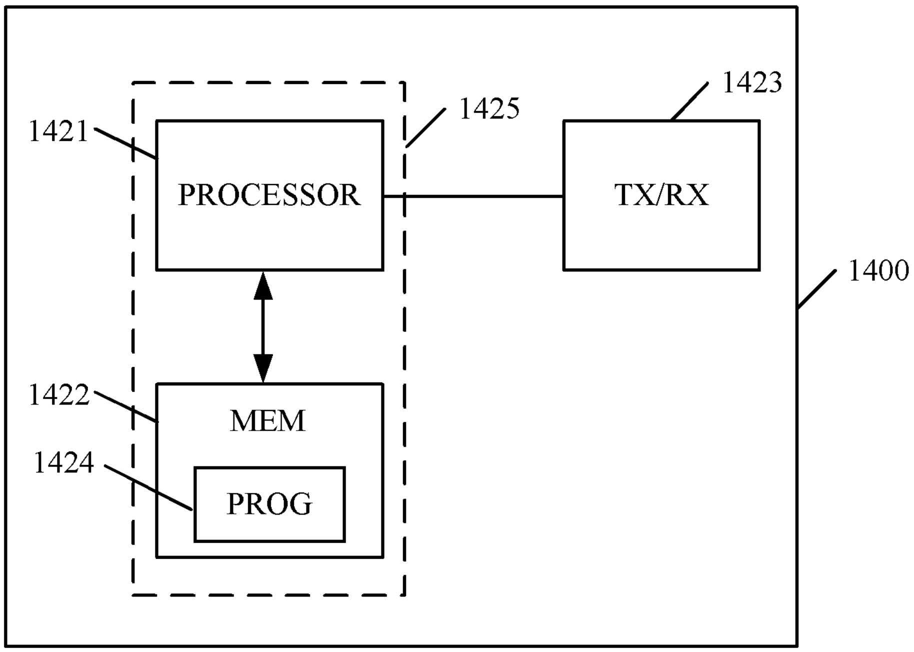
FIG. 14 is a block diagram showing an apparatus suitable for practicing some embodiments of the disclosure.

FIG. 14 is a block diagram showing an apparatus suitable for practicing some embodiments of the disclosure. For example, any one of the server, exposure function entity and the edge application server described above may be implemented as or through the apparatus 1400.

The apparatus 1400 comprises at least one processor 1421, such as a digital processor (DP), and at least one memory (MEM) 1422 coupled to the processor 1421. The apparatus 1420 may further comprise a transmitter TX and receiver RX 1423 coupled to the processor 1421. The MEM 1422 stores a program (PROG) 1424. The PROG 1424 may include instructions that, when executed on the associated processor 1421, enable the apparatus 1420 to operate in accordance with the embodiments of the present disclosure. A combination of the at least one processor 1421 and the at least one MEM 1422 may form processing means 1425 adapted to implement various embodiments of the present disclosure.

Various embodiments of the present disclosure may be implemented by computer program executable by one or more of the processor 1421, software, firmware, hardware or in a combination thereof.

The MEM 1422 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1421 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the server, the memory 1422 contains instructions executable by the processor 1421, whereby the server operates according to any step of any of the methods related to the server as described above.

In an embodiment where the apparatus is implemented as or at the edge application server, the memory 1422 contains instructions executable by the processor 1421, whereby the edge application server operates according to any step of the methods related to the edge application server as described above.

In an embodiment where the apparatus is implemented as or at the exposure function entity, the memory 1422 contains instructions executable by the processor 1421, whereby the exposure function entity operates according to any step of the methods related to the exposure function entity as described above.

Figure 15:
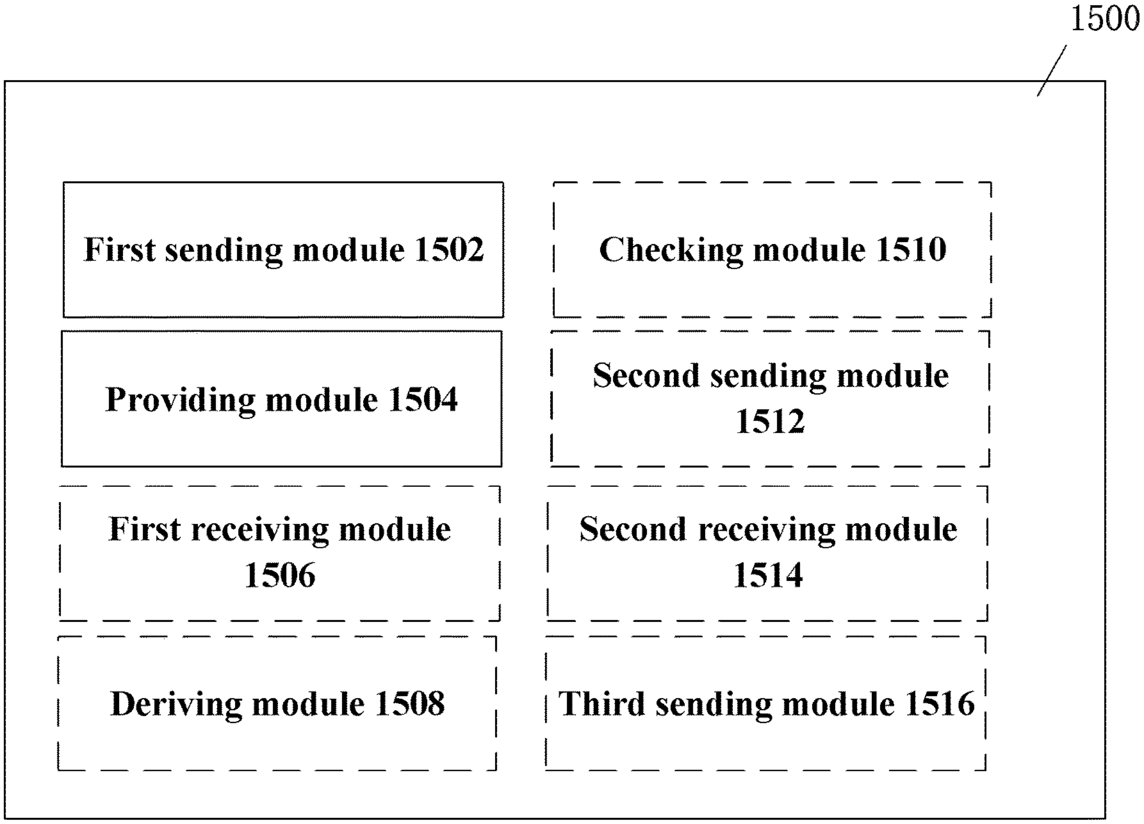
FIG. 15 is a block diagram showing a server according to an embodiment of the disclosure.

FIG. 15 is a block diagram showing a server according to an embodiment of the disclosure. As shown, the server 1500 comprises a first sending module 1502 and a providing module 1504. The first sending module 1502 may be configured to send a packet flow description (PFD) management request to an exposure function entity. The PFD management request comprises at least one PFD comprising information used for traffic detection of a specific application service and an application identifier corresponding to the specific application service. The providing module 1504 may be configured to provide specific quality of service (QoS) information and the application identifier corresponding to the specific application service for requesting data session with the specific QoS to a policy function entity.

In an embodiment, the server 1500 further comprises a first receiving module 1506 configured to receive a request for establishing a data session with the specific QoS from an edge application server. The request comprises the information used for traffic detection of the specific application service.

In an embodiment, the server 1500 further comprises a deriving module 1508 configured to derive the application identifier corresponding to the specific application service when the application identifier corresponding to the specific application service is absent in the request.

In an embodiment, the server 1500 further comprises a checking module 1510 configured to checking whether the edge application server is authorized.

In an embodiment, the server 1500 further comprises a second sending module 1512 configured to send an event monitoring request for session status of the data session to the exposure function entity In an embodiment, the server 1500 further comprises a second receiving module 1514 configured to receive a notification for session status of the data session from the exposure function entity.

In an embodiment, the server 1500 further comprises a third sending module 1516 configured to sending a response for the request to the edge application server.

Figure 16:
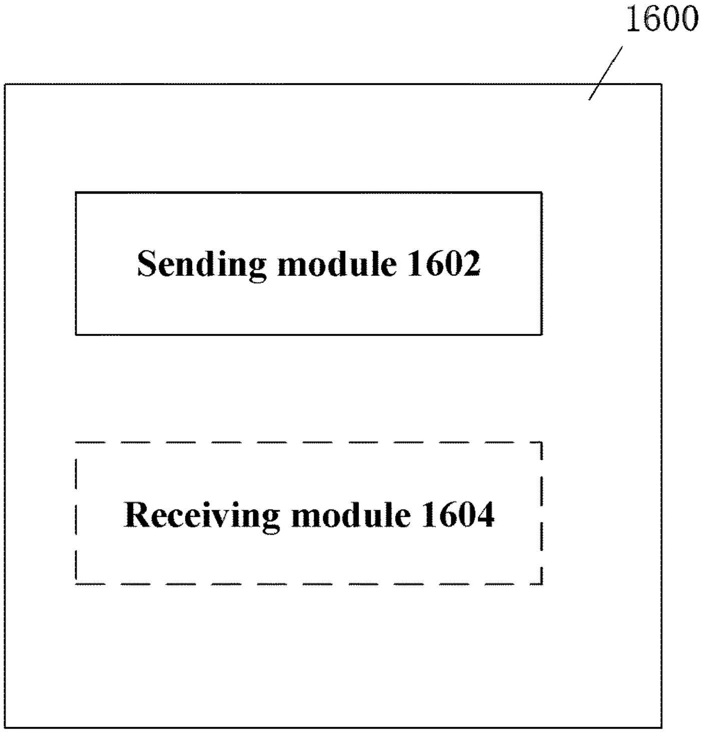
FIG. 16 is a block diagram showing an edge enabler server according to an embodiment of the disclosure.

FIG. 16 is a block diagram showing an edge enabler server according to an embodiment of the disclosure. As shown, the edge enabler server 1600 comprises a sending module 1602. The sending module 1602 may be configured to send a request for establishing a data session with specific quality of service (QoS) to an edge enabler server. The request comprises information used for traffic detection of a specific application service.

In an embodiment, the edge enabler server 1600 further comprises a receiving module 1604 configured to receive a response for the request from the edge enabler server.

Figure 17:
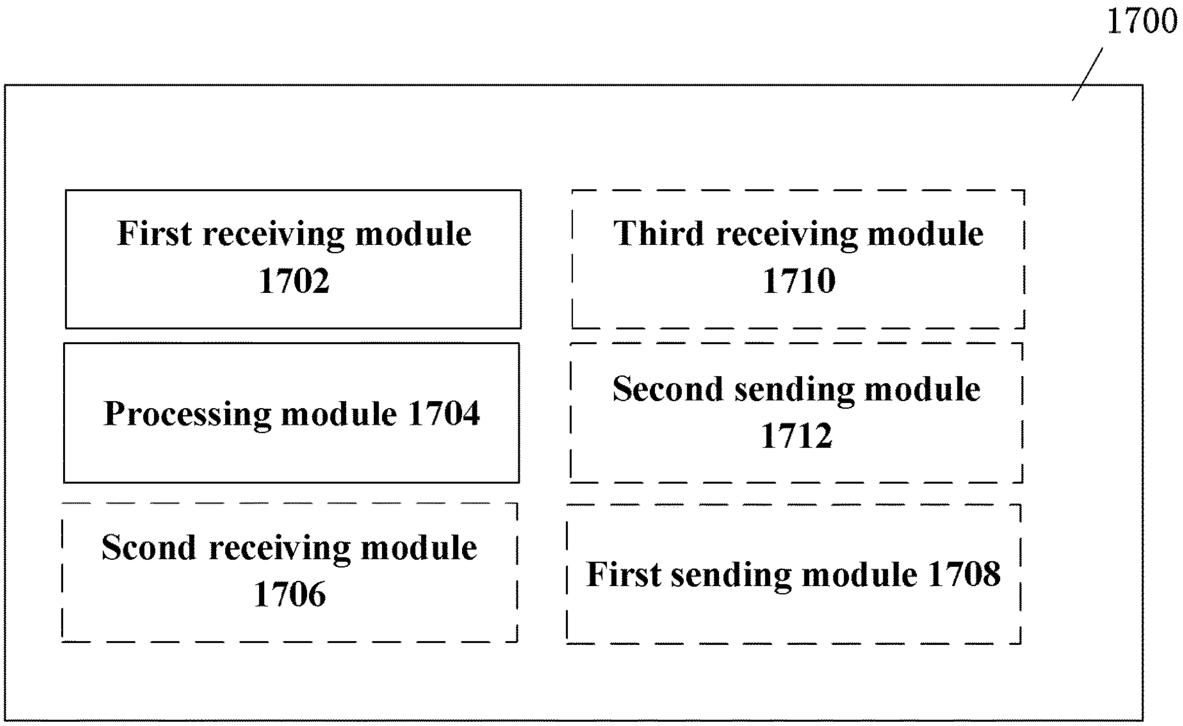
FIG. 17 is a block diagram showing an exposure function entity according to an embodiment of the disclosure.

FIG. 17 is a block diagram showing an exposure function entity according to an embodiment of the disclosure. As shown, the exposure function entity 1700 comprises a first receiving module 1702 and a processing module 1704. The first receiving module 1702 may be configured to receive a packet flow description (PFD) management request from a server. The PFD management request comprises at least one PFD comprising information used for traffic detection of a specific application service and an application identifier corresponding to the specific application service. The processing module 1704 may be configured to process the PFD management request.

In an embodiment, the exposure function entity 1700 further comprises a second receiving module 1706 configured to receive an event monitoring request for session status of a data session from the server.

In an embodiment, the exposure function entity 1700 further comprises a first sending module 1708 configured to send a notification for session status of the data session to the server.

In an embodiment, the exposure function entity 1700 further comprises a third receiving module 1710 configured to receive a message comprising specific QoS information and the application identifier corresponding to the specific application service for requesting data session with the specific QoS from the server In an embodiment, the exposure function entity 1700 further comprises a second sending module 1712 configured to sending a message comprising the specific QoS information and the application identifier corresponding to the specific application service for requesting data session with the specific QoS to a policy function entity.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the server, exposure function entity or the edge application server may not need a fixed processor or memory, any computing resource and storage resource may be arranged from the server, exposure function entity or the edge application server in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform one or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by an edge enabler server (EES), comprising:

sending a packet flow description (PFD) management request to a network exposure function (NEF), wherein the PFD management request comprises at least one PFD comprising information used for traffic detection of a specific application service and an application identifier corresponding to the specific application service; and providing specific quality of service (QoS) information and the application identifier corresponding to the specific application service for requesting data session with the specific QoS to a policy control function (PCF);

wherein the information used for traffic detection of the specific application service comprises one of: a domain name; and a uniform resource locator.

2. The method according to claim 1, wherein the domain name comprises Transport Layer Security Server Name Indication (TLS SNI).

3. The method according to claim 1, wherein the traffic detection of the specific application service comprises encrypted traffic detection of the specific application service.

4. The method according to claim 1, wherein providing the specific QoS information and the application identifier corresponding to the specific application service for requesting data session with the specific QoS to the policy function entity comprises:

directly sending a message comprising the specific QoS information and the application identifier corresponding to the specific application service for requesting data session with the specific QoS to the policy function entity; or providing the specific QoS information and the application identifier corresponding to the specific application service for requesting data session with the specific QoS to the policy function entity via the exposure function entity.

5. The method according to claim 1, wherein the method further comprises:

receiving a request for establishing a data session with the specific QoS from an edge application server, wherein the request comprises the information used for traffic detection of the specific application service.

6. The method according to claim 5, wherein when the application identifier corresponding to the specific application service is absent in the request, the method further comprises:

deriving the application identifier corresponding to the specific application service.

7. The method according to claim 5, further comprising:

checking whether the edge application server is authorized.

8. The method according to claim 5, further comprising:

sending a response for the request to the edge application server.

9. The method according to claim 5, wherein the data session comprises a protocol data unit (PDU) data session between an application client and the edge application server.

10. A method performed by an edge application server, comprising:

sending a request for establishing a data session with specific quality of service (QoS) to an edge enabler server, wherein the request comprises information used for traffic detection of a specific application service;

wherein the information used for traffic detection of the specific application service comprises one of: a domain name; and a uniform resource locator.

11. The method according to claim 10, wherein the domain name comprises Transport Layer Security Server Name Indication (TLS SNI).

12. The method according to claim 10, wherein the traffic detection of the specific application service comprises encrypted traffic detection of the specific application service.

13. A server, comprising:

a processor; and a memory coupled to the processor, said memory containing instructions executable by said processor, whereby said server is operative to:

send a packet flow description (PFD) management request to a network exposure function (NEF), wherein the PFD management request comprises at least one PFD comprising information used for traffic detection of a specific application service and an application identifier corresponding to the specific application service; and provide specific quality of service (QoS) information and the application identifier corresponding to the specific application service for requesting data session with the specific QoS to a policy control function (PCF);

wherein the information used for traffic detection of the specific application service comprises one of: a domain name; and a uniform resource locator.

14. An edge application server, comprising:

a processor; and a memory coupled to the processor, said memory containing instructions executable by said processor, whereby said edge application server is operative to:

send a request for establishing a data session with specific quality of service (QoS) to an edge enabler server, wherein the request comprises information used for traffic detection of a specific application service;

wherein the information used for traffic detection of the specific application service comprises one of: a domain name; and a uniform resource locator.

* * * * *